(12) United States Patent
Kubo et al.

(10) Patent No.: US 6,456,827 B1
(45) Date of Patent: Sep. 24, 2002

(54) APPARATUS AND METHOD FOR CONTROLLING COMMUNICATIONS BASED ON MOVING SPEED

(75) Inventors: Tokuro Kubo; Morihiko Minowa, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/123,548

(22) Filed: Jul. 28, 1998

(30) Foreign Application Priority Data

Feb. 3, 1998 (JP) .......................................... 10-021761

(51) Int. Cl.$^7$ .............................................. H04B 7/216
(52) U.S. Cl. ........................ 455/68; 342/104; 342/108; 375/140; 375/150
(58) Field of Search ................................ 455/441, 504, 455/506, 69, 522, 68; 375/134, 137, 142, 144, 146, 147, 150, 140; 342/104, 105, 108

(56) References Cited

U.S. PATENT DOCUMENTS

| 4,811,421 A | | 3/1989 | Havel |
| 5,432,822 A | * | 7/1995 | Kaewell et al. ............. 375/340 |
| 5,574,984 A | | 11/1996 | Reed |
| 5,634,206 A | * | 5/1997 | Reed et al. ............. 455/277.1 |
| 6,026,115 A | * | 2/2000 | Higashi et al. ............. 375/367 |

* cited by examiner

Primary Examiner—Lee Nguyen
(74) Attorney, Agent, or Firm—Katten Muchin Zavis Rosenman

(57) ABSTRACT

A communication control apparatus installed in a base station or a mobile station in mobile communications system estimates the relative moving speed of an opposing station, and adjusts the values of communication parameters for a searcher, a transmission power control unit, an absolute synchronous detector unit, etc. according to an obtained moving speed.

16 Claims, 49 Drawing Sheets

| ESTIMATED SPEED (km/h) | CONTROL SIGNAL | STAGE |
|---|---|---|
| 0 | 000 | A |
| 0 - 40 | 001 | B |
| 40 - 80 | 010 | C |
| 80 - 120 | 011 | D |
| 120 < | 100 | E |

FIG. 8

| ESTIMATED SPEED (km/h) | SW1 | SW2 | SW3 | SW4 | SW5 |
|---|---|---|---|---|---|
| 0 | ON | ON | ON | ON | ON |
| 0 – 80 | OFF | ON | ON | ON | OFF |
| 80 < | OFF | OFF | ON | OFF | OFF |

F I G. 17

| ESTIMATED SPEED (km/h) | WEIGHT COEFFICIENT | | | | |
|---|---|---|---|---|---|
| | K1 | K2 | K3 | K4 | K5 |
| 0 | 1.0 | 1.0 | 1.0 | 1.0 | 1.0 |
| 0 – 80 | 0.5 | 1.0 | 1.0 | 1.0 | 0.5 |
| 80 < | 0.2 | 0.5 | 1.0 | 0.5 | 0.2 |

FIG. 19

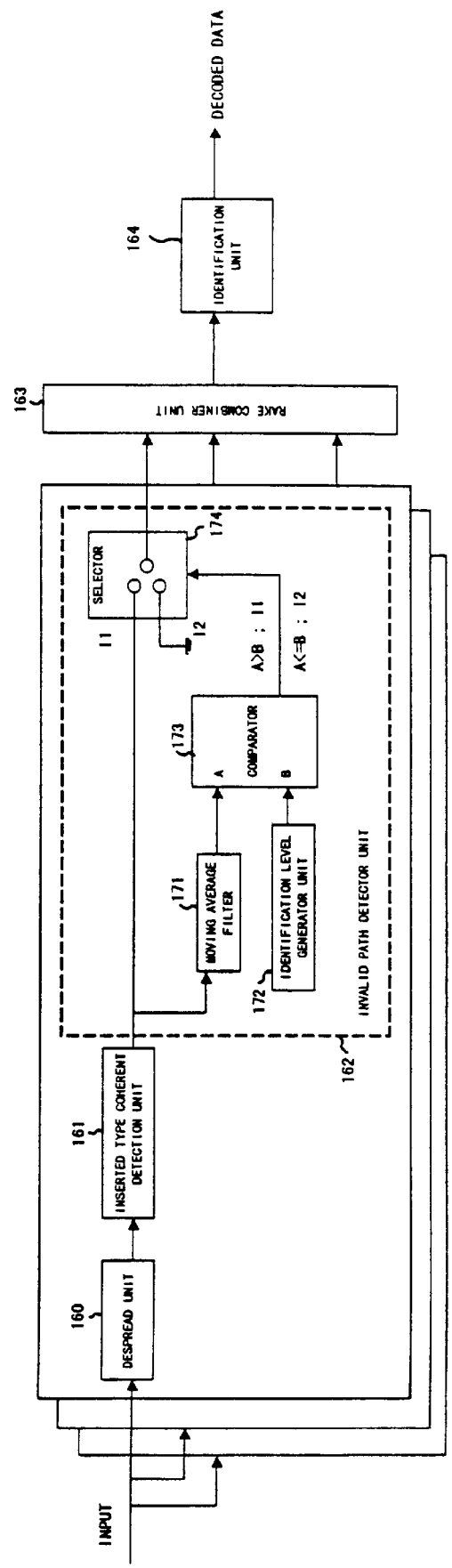
F I G. 20

| ESTIMATED SPEED (km/h) | FILTER LENGTH |
|---|---|
| 0 | 5 msec |
| 0 -80 | 10 msec |
| 80 < | 15 msec |

FIG. 22

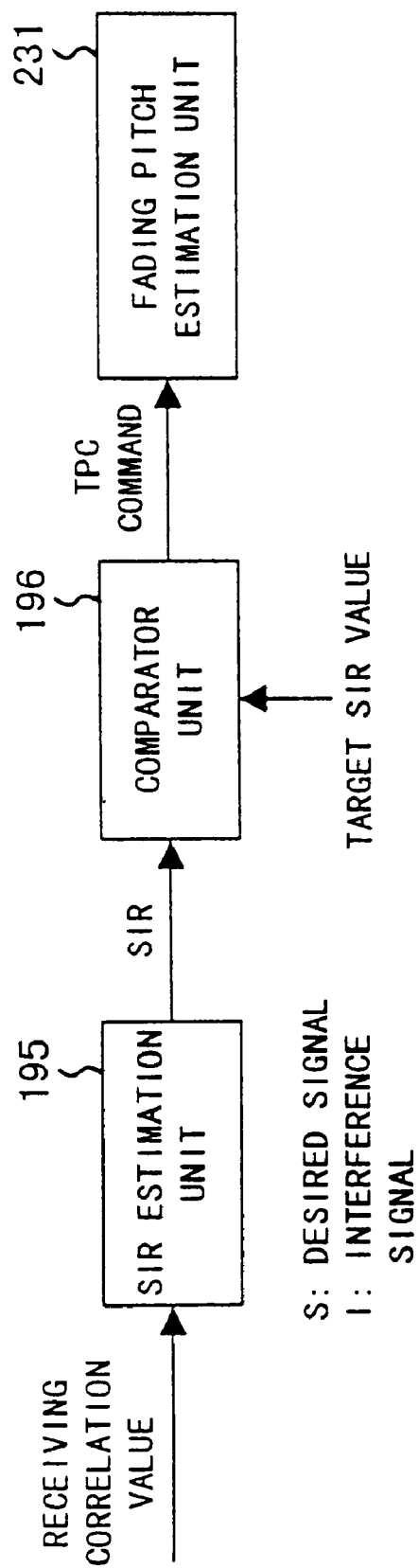
F I G. 27

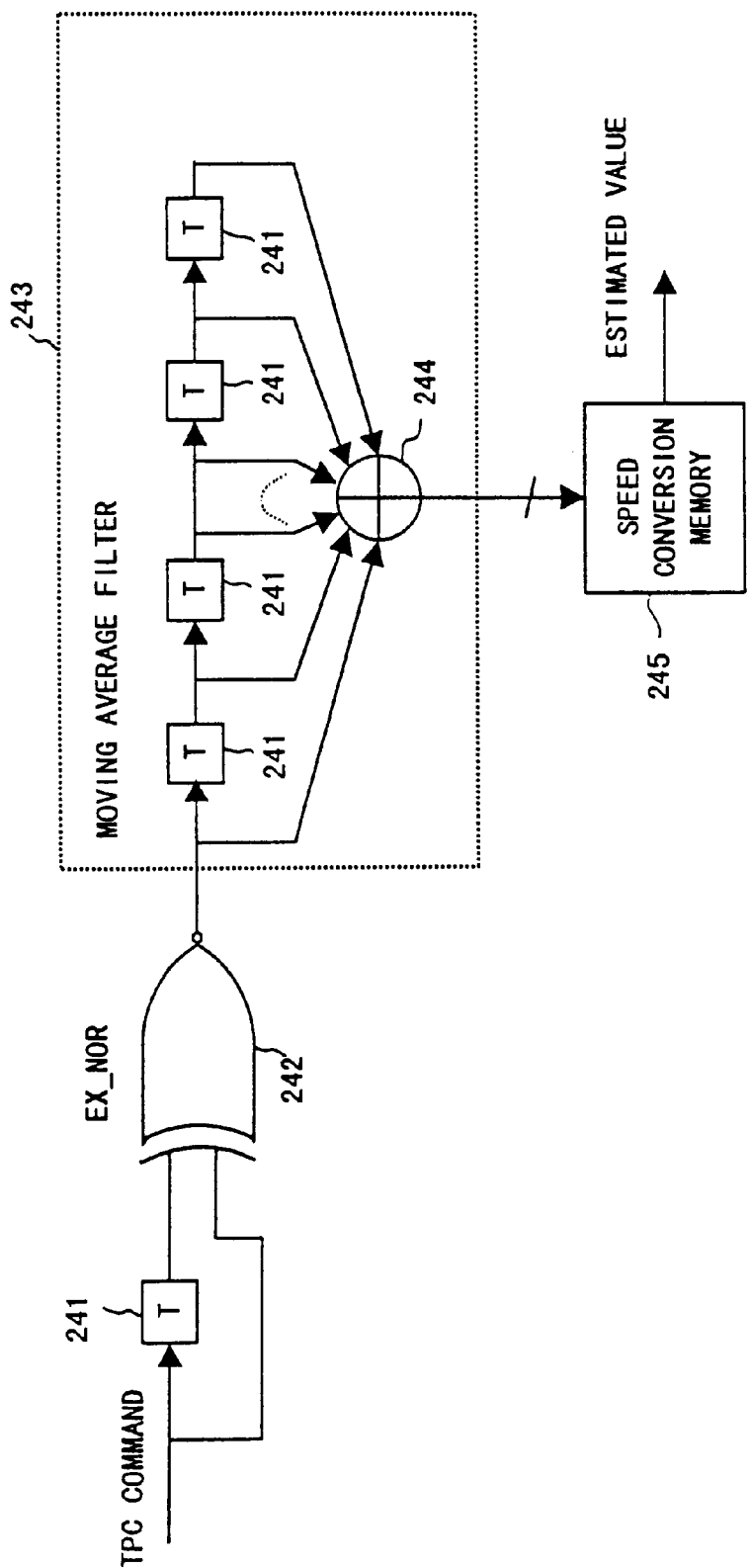
F I G. 32

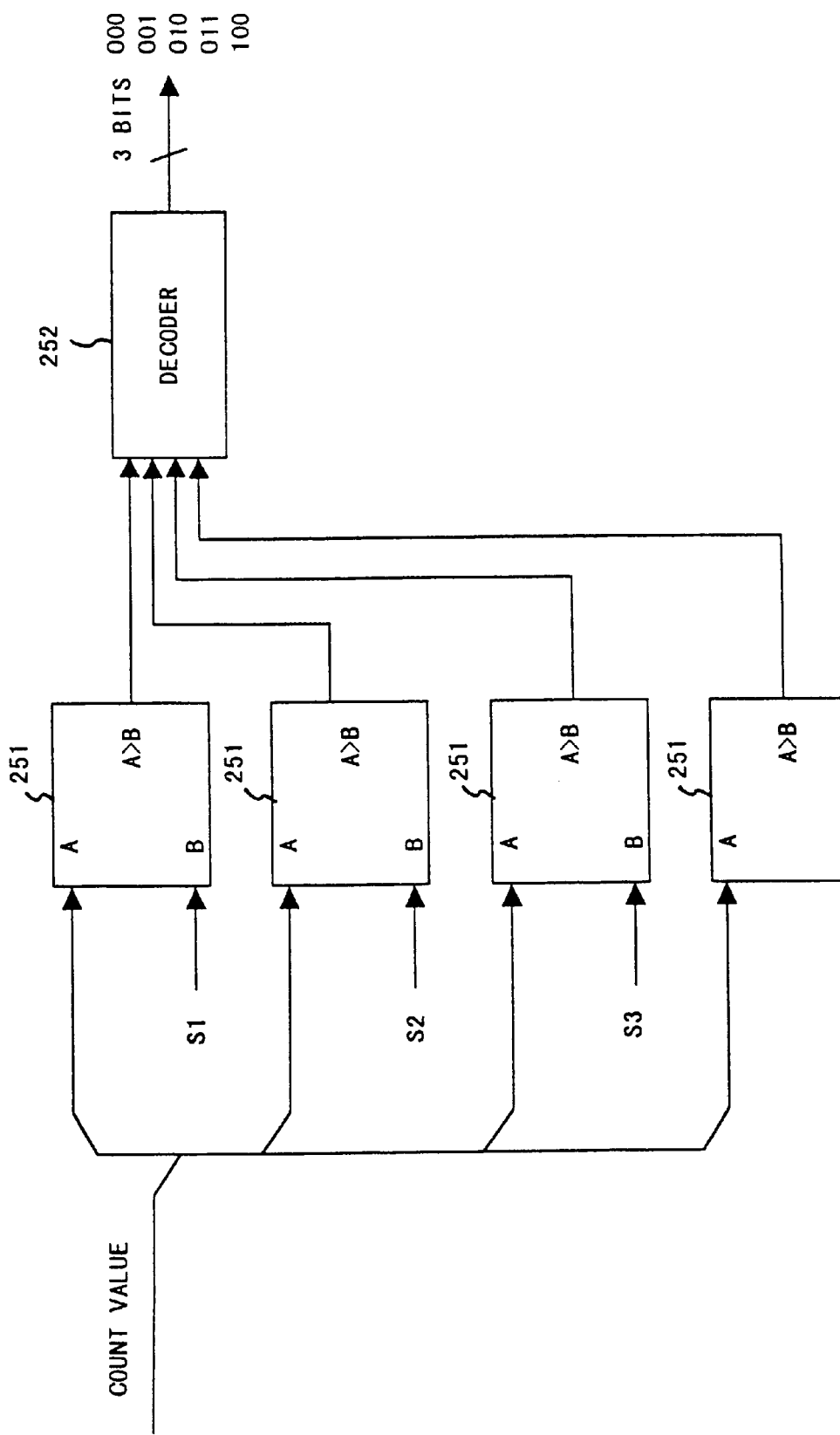
F I G. 34

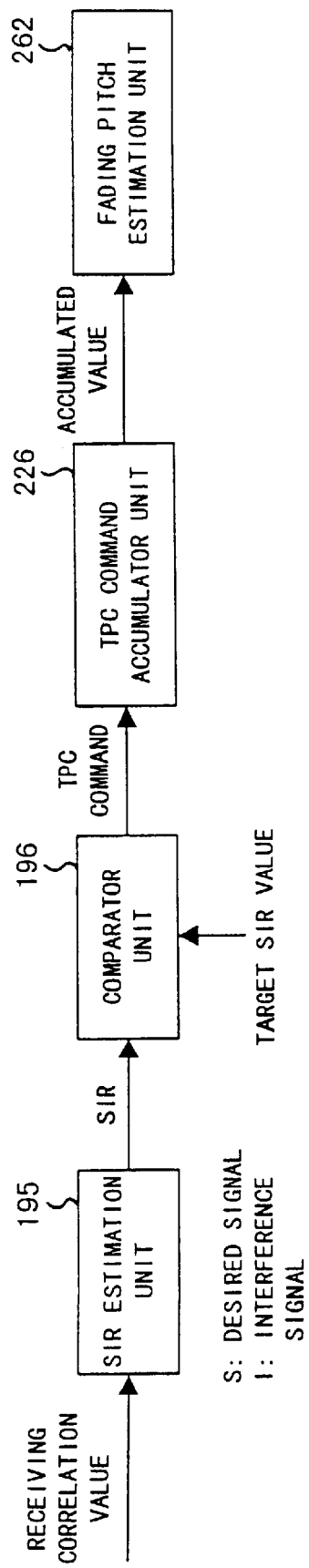
F I G. 35

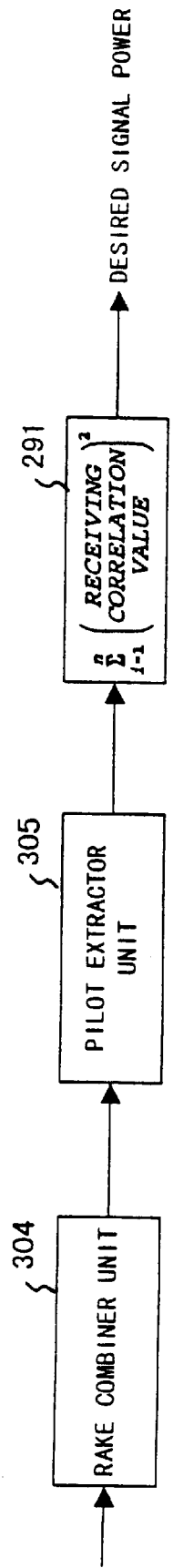
F I G. 43

APPARATUS AND METHOD FOR CONTROLLING COMMUNICATIONS BASED ON MOVING SPEED

BACKGROUND OF THE INVENTION

1. Field of the Invention

The present invention relates to a communication control apparatus and method for setting the parameters for a communication apparatus in a base station to optimal values based on an estimated moving speed of a mobile station in a mobile communications system.

2. Description of the Related Art

Conventionally, for a channel multiplex method in a mobile communications system, a time division multiple access (TDMA) system, a frequency division multiple access (FDMA) system, etc. have been used. However, the development of a method with a more efficient use of frequency is desired, and particularly, a direct sequence code division multiple access (DS-CDMA) system is a promising candidate, since a large volume of communications is available in this system.

The DS-CDMA system is one kind of a spread spectrum communication system. In this system, on the transmitting side, data signals are transmitted with the spread spectrum by using the same frequency for a plurality of channels and multiplying the data signals by an independent spread code with a broad band for each channel. On the receiving side the data signals for each channel are restored by multiplying received signals by the same spread code. The multiplication of a spread code on the receiving side is called a reverse-spread. When this DS-CDMA system is applied to mobile communications, a searcher function, a transmission power control function, a coherent detection function, etc. are indispensable features.

A searcher function means a function for detecting a transmission path and a despread code timing being a timing for performing a reverse-spread. A transmission power control function means a function for modifying a transmission power against a distance problem due to the difference in the distance between a mobile station and a base station, and an instantaneous fluctuation (fading) due to multi-paths. A coherent detection function means a function for adding a pilot signal to data signals in order to obtain a required bit error rate (BER) in a lower transmission power when transmitting, and performing a coherent detection.

In mobile communications a stable communication is required in a variety of dynamically changing environments, such that a mobile station may transit from a stationary status to a high-speed status, that a mobile station may transit from an urban environment to a suburban environment, etc. Particularly, in a multi-path environment with reflected waves and delayed waves passing through a plurality of transmission lines, countermeasures are indispensable, since fading (instantaneous value fluctuation) is generated by such interference. In the DS-CDMA system, effective fading countermeasures are also desired in connection with each of the above-mentioned functions.

However, there are the following problems in mobile communications using the DS-CDMA system.

Generally speaking, although there are optimal values for parameters for each unit of a communication apparatus against a fading generated during the communication, each parameter is not always set to the optimal value, since the fluctuation speed of the fading varies depending on the moving speed of the mobile station (or fading pitch). Therefore, when the parameters are not optimized, the receiving characteristic is degraded, and thereby the channel capacity is reduced.

Since as described above, the DS-CDMA system comprises a searcher function, a transmission power control function, a coherent detection function, etc., it is necessary to dynamically modify the parameters of these functions and to reduce the influence of fading on received signals.

SUMMARY OF THE INVENTION

It is an object of the present invention to provide a communication control apparatus and method for setting each parameter for a communication apparatus to an optimal value in mobile communications using a DS-CDMA system, etc.

The communication control apparatus of the present invention comprises a speed estimation unit and a modification unit, and controls parameters for mobile communications between a transmitting station and a receiving station.

The speed estimation unit estimates the moving speed of either the transmitting station or the receiving station, and outputs a control signal corresponding to the estimated moving speed. The modification unit modifies the value of the parameters based on the control signal.

Each of the transmitting station and the receiving station corresponds to a base station or a mobile station in mobile communications. For example, the speed estimation unit estimates the moving speed of the receiving station using a transmission power control command transmitted from the receiving station to the transmitting station, and estimates the moving speed of the transmitting station using a desired signal power generated in the receiving station. In fact, since either of the base station and the mobile station has both functions of a transmitting station and a receiving station, either of the base station and the mobile station can estimate the moving speed of an opposing station using either the transmission power control command or desired signal power.

The modification unit modifies a variety of apparatus parameters for the transmitting and receiving stations based on a control signal outputted from the speed estimation unit. For these parameters, the frequency of a search operation for detecting a timing for despreading spread spectrum signals, the accumulation frequency of receiving correlation values in the search operation, the number and weight coefficient of pilot signals used in a coherent detection, an observation length for observing signals in an invalid path detection, the power value variation width and power value modification frequency in a transmission power control, etc. are considered. By controlling these parameters based on a control signal, communication control is available according to the moving speed, and thereby the receiving characteristic of the receiving station is improved.

BRIEF DESCRIPTION OF THE DRAWINGS

FIG. 8 shows five increments of estimated speeds.

FIG. 17 shows a switch control method.

FIG. 19 shows a weight coefficient control method.

FIG. 20 shows the configuration of a first invalid path detector unit.

FIG. 22 shows a filter length control method.

FIG. 27 shows a speed estimation using a TPC command.

FIG. 32 shows the first configuration example of a fading pitch estimation unit.

FIG. 34 shows a circuit for generating a fading pitch from a count value.

FIG. 35 shows a speed estimation using the accumulated value of a TPC command.

FIG. 43 shows a first power composition.

DESCRIPTION OF THE PREFERRED EMBODIMENTS

The embodiments of the present invention are described in detail below with reference to the drawings.

Figure 1:
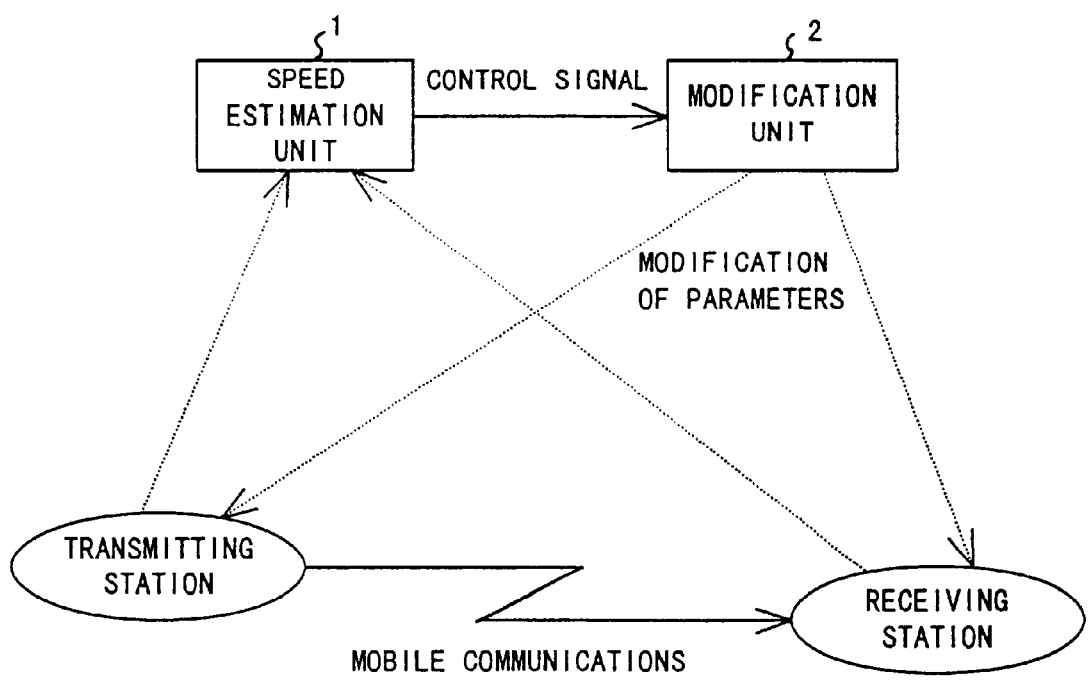
FIG. 1 shows the principle of the communication control apparatus of the present invention.

FIG. 1 shows the principle of the communication control apparatus of the present invention. The communication control apparatus shown in FIG. 1 comprises a speed estimation unit 1 and a modification unit 2, and controls parameters for mobile communications between a transmitting and a receiving station.

The speed estimation unit 1 estimates the moving speed of either the transmitting station or the receiving station described above, and outputs a control signal corresponding to the estimated moving speed. The modification unit 2 modifies the value of the above-mentioned parameters based on this control signal.

Each of the transmitting station and the receiving station corresponds to a base station or a mobile station in mobile communications. For example, the speed estimation unit 1 estimates the moving speed of the receiving station using a transmission power control command transmitted from the receiving station to the transmitting station, and estimates the moving speed of the transmitting station using a desired signal power generated in the receiving station. In fact, since either of the base station and the mobile station has both the functions of a transmitting station and a receiving station, either of the base station and the mobile station can estimate the moving speed of an opposing station using either the transmission power control command or desired signal power.

The modification unit 2 modifies a variety of apparatus parameters for the transmitting and receiving stations based on a control signal outputted from the speed estimation unit 1. For these parameters, the frequency of a search operation for detecting a timing for despreading spread spectrum signals, the accumulation frequency of receiving correlation values in the search operation, the number and weight coefficient of pilot signals used in a coherent detection, an observation length for observing signals in an invalid path detection, the power value variation width and power value modification frequency in a transmission power control, etc. are considered. By controlling these parameters based on a control signal, communication control is available according to the moving speed, and thereby the receiving characteristic of the receiving station is improved.

Figure 4:
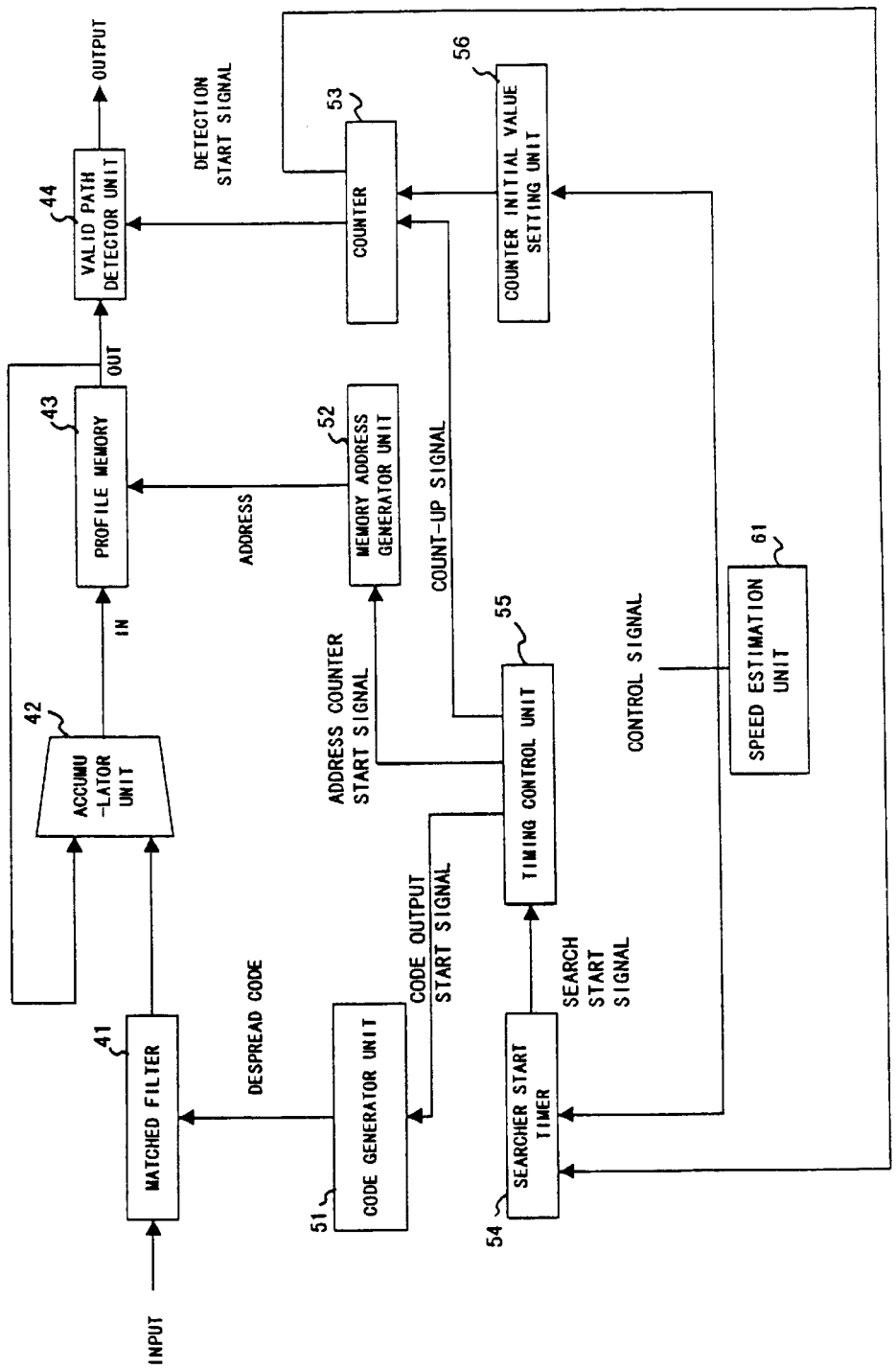
FIG. 4 shows the configuration of a first searcher.
Figure 12:
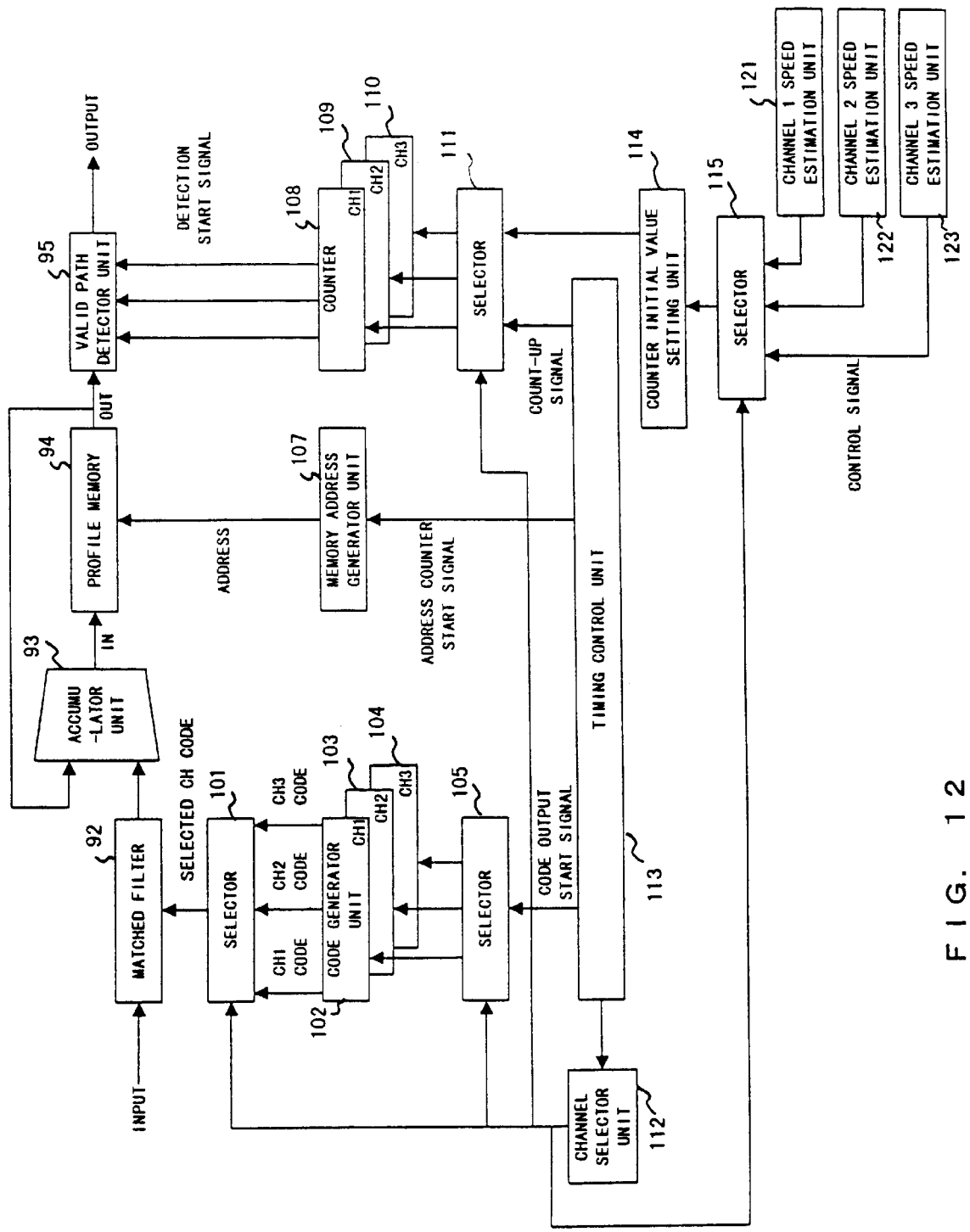
FIG. 12 shows the configuration of a second searcher.
Figure 16:
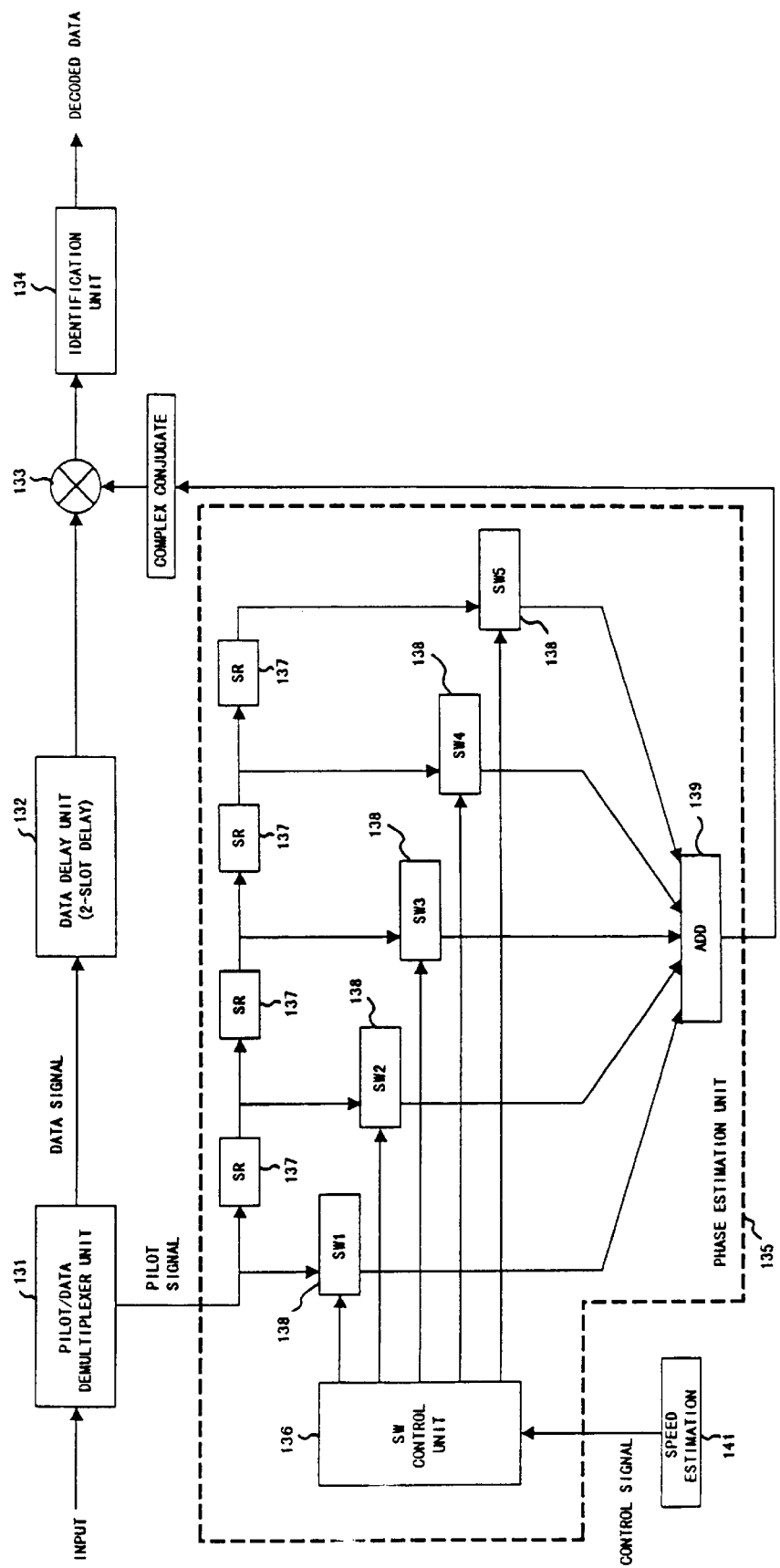
FIG. 16 shows the configuration of a first inserted type coherent detection circuit.
Figure 18:
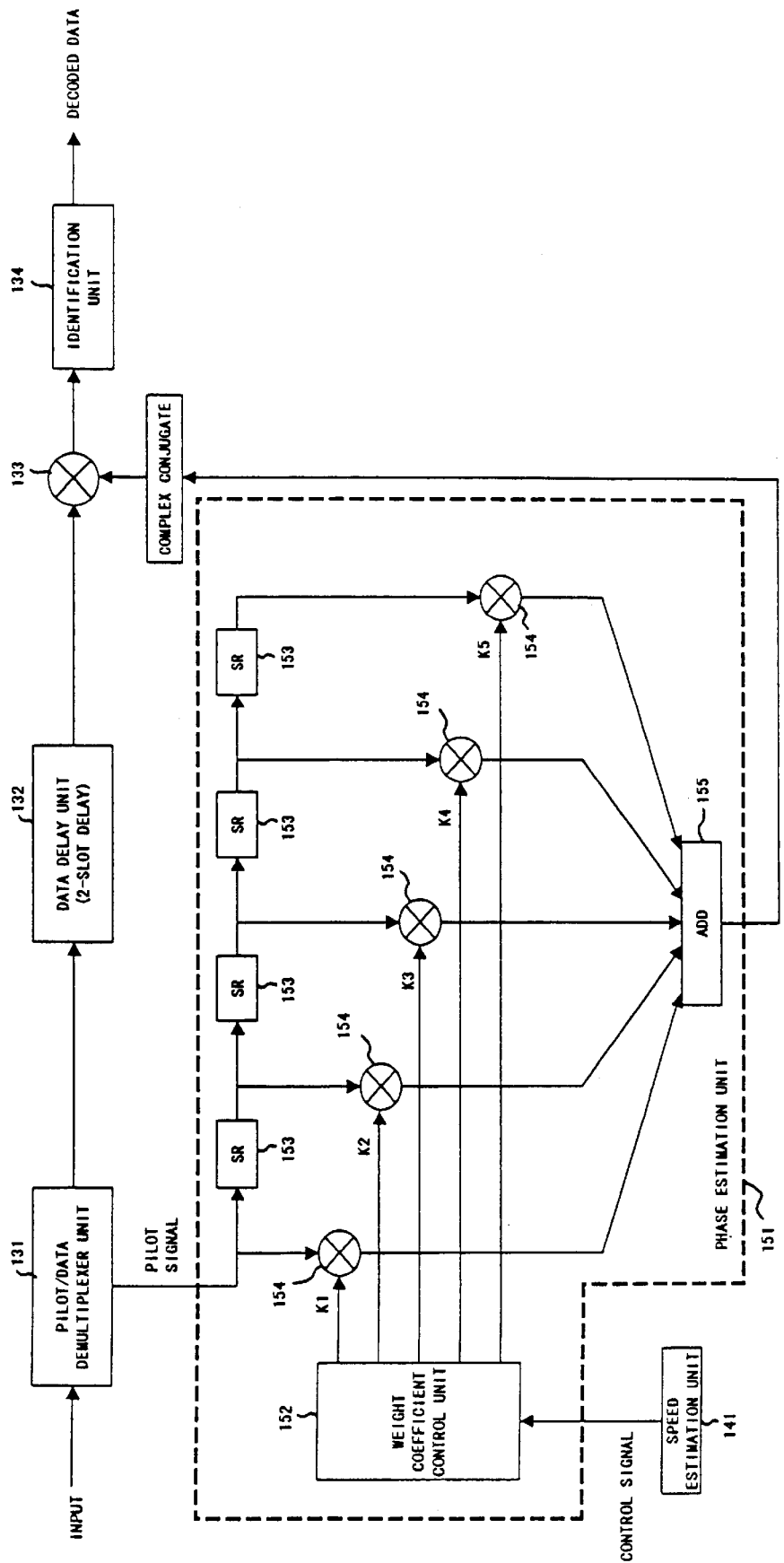
FIG. 18 shows the configuration of a second inserted type coherent detection circuit.
Figure 21:
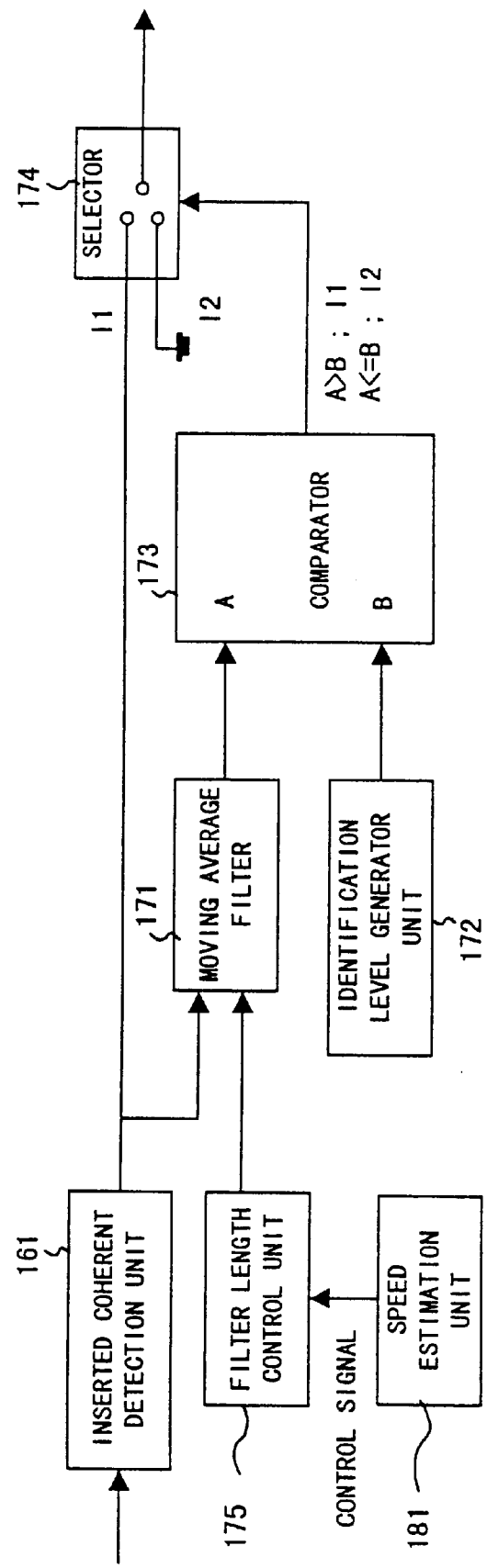
FIG. 21 shows the configuration of a second invalid path detector unit.
Figure 25:
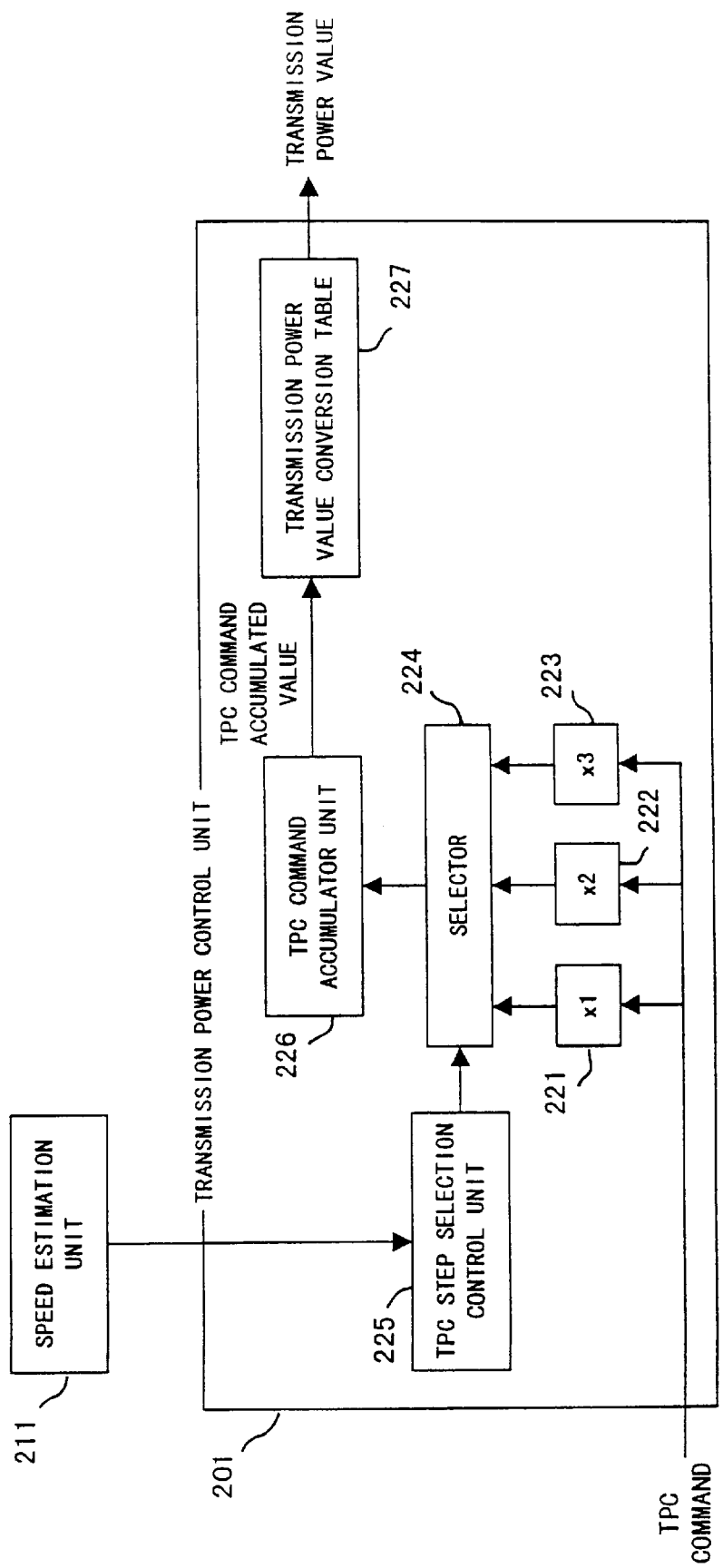
FIG. 25 shows the configuration of the transmission power control unit of the transmitter.
Figure 26:
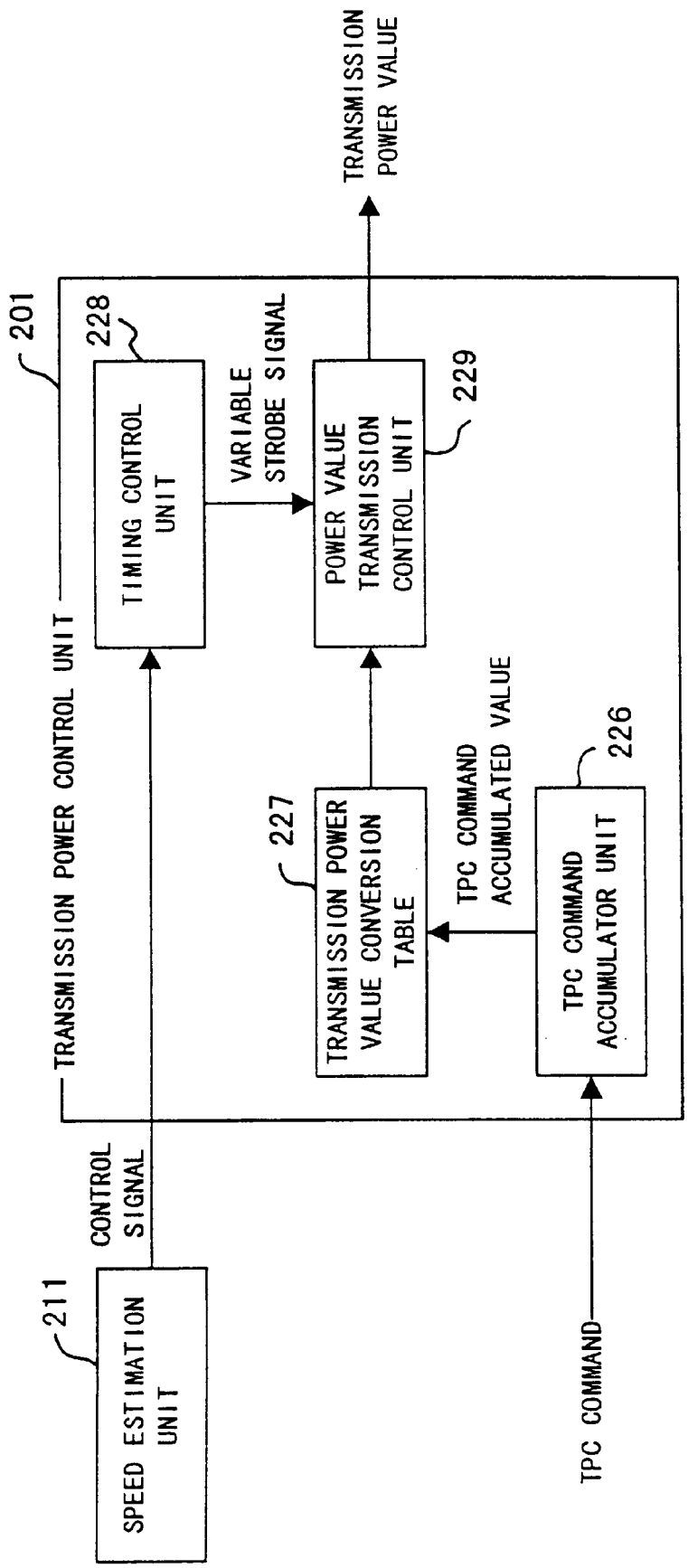
FIG. 26 shows the timing control of power value transmission.

For example, the speed estimation unit 1 shown in FIG. 1 corresponds to a speed estimation unit 61 shown in FIG. 4, etc., and the modification unit 2 corresponds to a searcher start timer 54 and a counter initial value setting unit 56 shown in FIG. 4, a counter initial value setting unit 114 shown in FIG. 12, a switch control unit 136 shown in FIG. 16, a weight coefficient control unit 152 shown in FIG. 18, a filter length control unit 175 shown in FIG. 21, a TPC step selection control unit 225 shown in FIG. 25 and a timing control unit 228 shown in FIG. 26.

It is necessary to estimate the moving speed of a mobile station in a base station in order to optimize each parameter for a communication apparatus in the base station. However, in a DS-CDMA system, since a plurality of channels are overlaid on the same frequency, unlike a TDMA or FDMS system which are also known as multiplex systems, it is difficult to estimate a moving speed based on the measurement of the receiving field strength.

Therefore, in this embodiment the moving speed is estimated utilizing a TPC command used in the transmission power control (TPC) of a DS-CDMA system or the receiving correlation value of a received wave. Then, the value of each parameter for a searcher, transmission power control unit, a phase estimation unit in a coherent detection, etc. is set so as to be optimized against generated fading.

First, a configuration for setting a variety of parameters according to the moving speed, and then a configuration for estimating the moving speed are described. Although in the following embodiments, mainly the moving speed estimation and parameter control for a mobile station by a base station are described, the similar configuration can also be adopted in the mobile station. In this case, the relative moving speed against the mobile station of the base station can be estimated, and a variety of parameters for apparatuses at the mobile station based on the estimated moving speed can be set.

Figure 2:
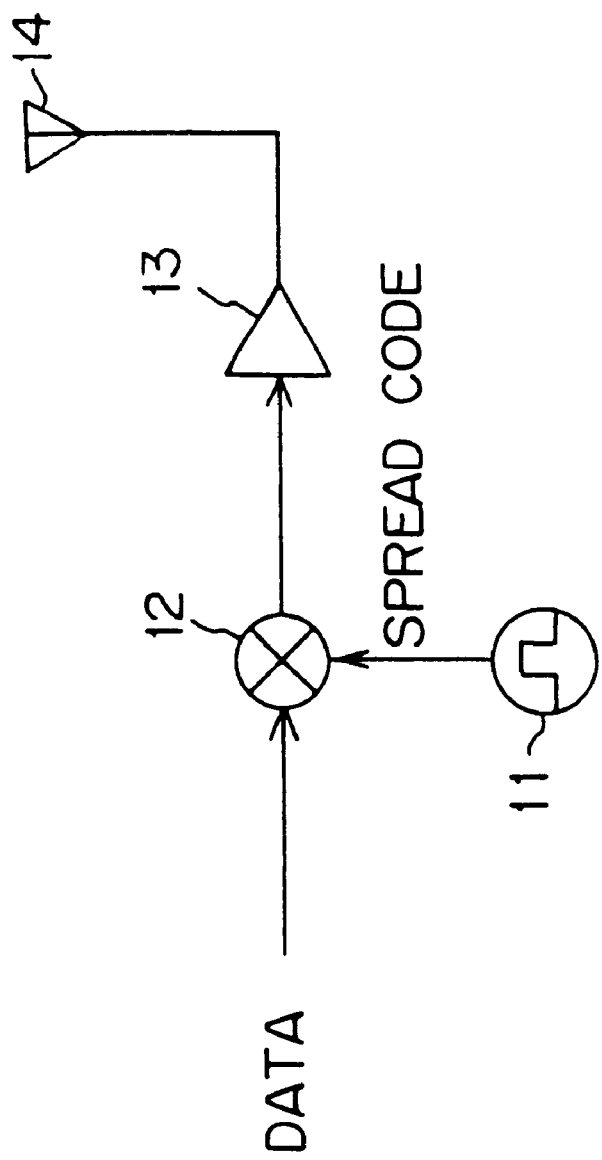
FIG. 2 shows the principle of a transmitter.
Figure 3:
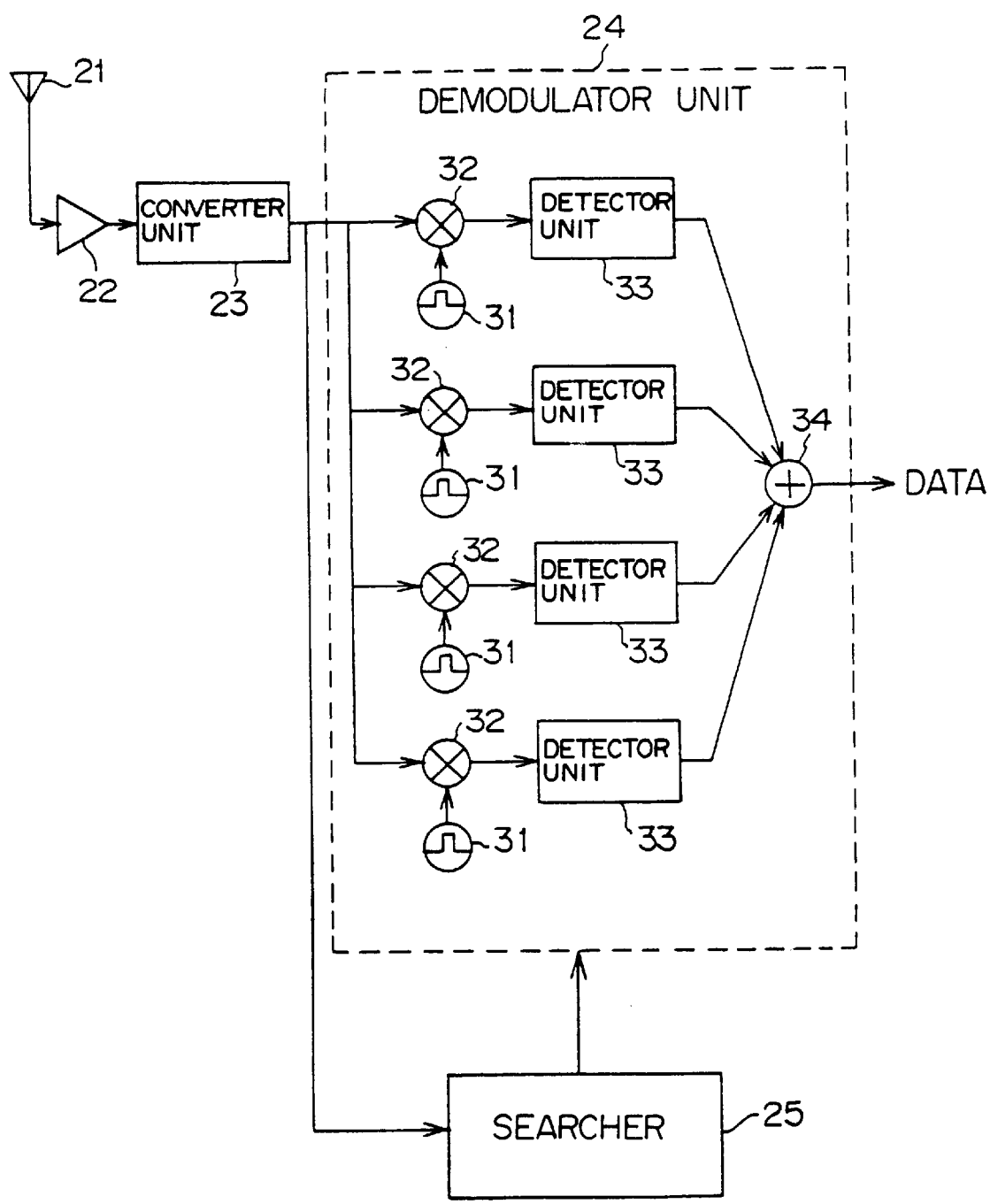
FIG. 3 shows the principle of a first receiver.

FIG. 2 and FIG. 3 show the conceptual principle of a transmitter and a receiver of a DS-CDMA system, respectively. In FIG. 2, data to be transmitted overlaid on a carrier are multiplied by a spread code from a code generator 11 using a multiplier 12, and are transmitted from an antenna 14 through an amplifier 13. For the logic of the multiplier 12 an arbitrary logic such as an exclusive-OR (EXOR), etc. is used.

In FIG. 3, received signals inputted from an antenna 21 are converted to baseband signals (digital signals) by a converter unit 23 after passing through an amplifier 22, and are restored to the original data by a demodulator unit 24.

The demodulator unit 24 comprises a plurality of sets consisting of a code generator 31, a multiplier 32 and a detector unit 33. Each code generator 31 generates a despread code with a different timing. For the despread code usually the same code as a spread code used for transmission is used. The multiplier 32 multiplies signals by a despread code, and restores the spectrum to the original band. The detector unit 33 detects the despread signals. An adder 34 sums and outputs the outputs of the detector units 33.

A searcher 25 is provided in order to match the timings of a spread on the transmitting side and a despread on the receiving side. The searcher 25 judges the signal delay of each path in a multi-path environment from the output signals of the converter unit 23, and controls the timing of each code generator 31 so that a reverse spread may be performed with a timing in accordance with each path. In this way, data consisting of signals passing through a plurality of paths are outputted from the demodulator unit 24.

Next, an embodiment for optimizing the parameter for the searcher 25 using an estimated moving speed is described below.

FIG. 4 shows a configuration example of the searcher 25 using a matched filter. In FIG. 4, a matched filter 41 generates a correlation value for a desired signal from the inputted signals. An accumulator unit 42 adds and accumulates the correlation values in order to improve the signal-to-noise ratio (SNR), and stores the accumulated values in a profile memory 43. A valid path detector unit 44 extracts one or more peak values greater than a certain value from the accumulated values stored in the profile memory 43. Then, the valid path detector unit 44 regards each peak as a peak corresponding to one valid path, and sets the path timing in each code generator 31 shown in FIG. 3.

A code generator unit 51 generates a despread code according to a code output start signal from a timing control unit 55, and provides the despread code to the matched filter 41 as a multiplication coefficient. A memory address generator unit 52 comprises an address counter. The memory address generator unit 52 generates a memory address according to an address counter start signal from the timing control unit 55, and provides the memory address to the profile memory 43 as a write address. A counter 53 counts the number of accumulation additions according to a count-up signal, and outputs a detection start signal to the valid path detector unit 44 when the count value reaches a certain value.

A searcher start timer 54 optimizes the frequency of search operations according to the moving speed of a mobile station estimated by a speed estimation unit 61, and outputs a search start signal to the timing control unit 55 based on the optimal search frequency. In this embodiment, an optimization means to control the search frequency so as to reduce the search frequency when the moving speed is low, since at that time the timing of despread changes slowly, and so as to increase the search frequency when the moving speed is high, since at that time the timing changes rapidly.

By optimizing the search frequency using the estimated moving speed the timing detection of despread can be prevented from being late for path fluctuations, and thereby the search operation can be prevented from being performed more than needed. Accordingly, the power consumption of the searcher is reduced.

In order to improve the SNR of a receiving correlation value at one search operation the optimization of the number of the accumulation additions based on the moving speed can also be considered. Fading is generated when a mobile station moves. Accordingly, even while a receiving correlation value is detected with a certain timing, the value is detected at a low level when the value corresponds to the trough of fading, and the reliability of the timing is low.

For this reason, the number of the accumulation additions is set to an appropriate number by altering the number between when a mobile station of each channel moves and when the station stands still, or between when the station travels at a high speed and when the station travels at a low speed. When the station stands still (or travels at a low speed), the number of the accumulation additions is set to a small number, since there is little path fluctuation. When the station moves (at a high speed), the number is set to a large number, since there is a lot of path fluctuation. In order to implement a control like this a counter initial value setting unit 56 modifies the initial value of the counter 53 according to the moving speed estimated by the speed estimation unit 61.

Figure 5:
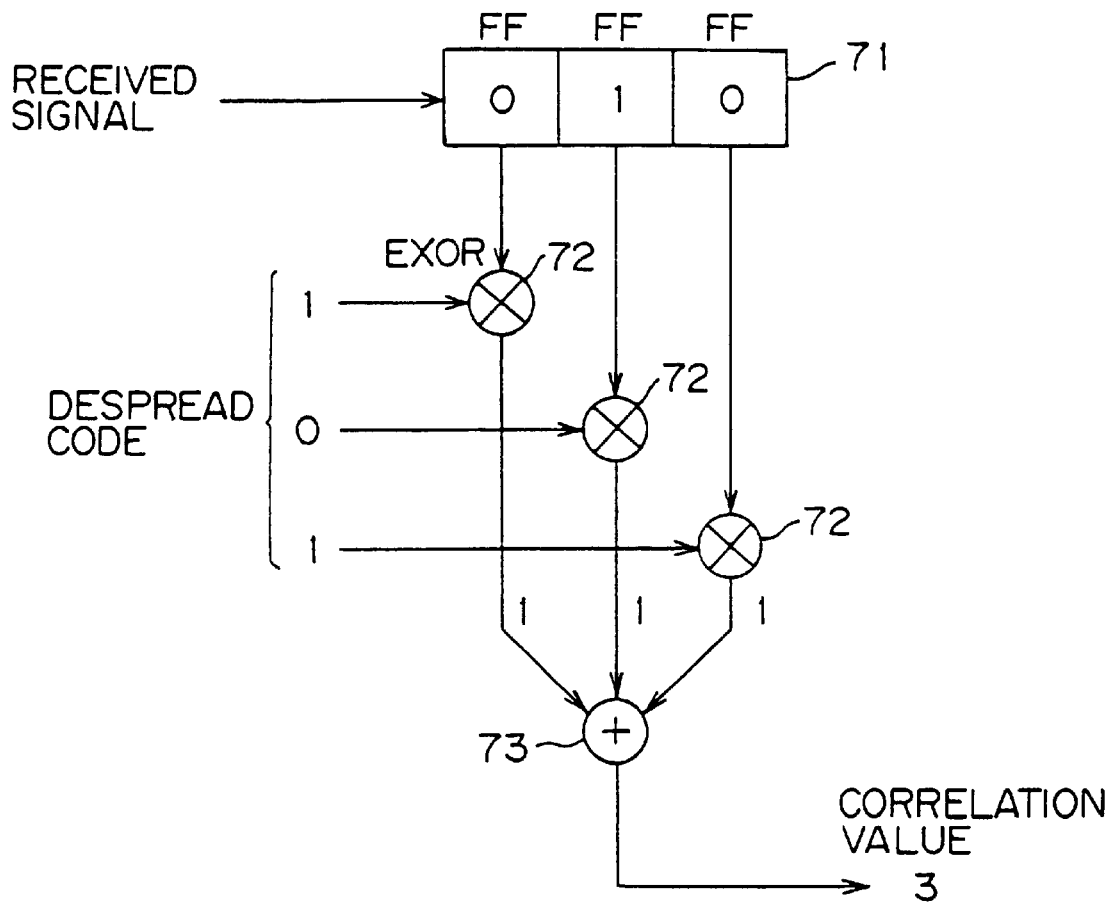
FIG. 5 shows the configuration of a matched filter.

The configuration and operation of the matched filter 41 are described below. FIG. 5 shows the configuration of the matched filter 41 in the case where a 3-bit spread code is assumed to be used, to simplify the description. In FIG. 5, a delay unit 71 consists of three flip-flops (FF), and converts an inputted serial signal to a 3-bit parallel signal. Three multipliers 72 multiply this parallel signal by a 3-bit despread code. An adder 73 sums the outputs of these multipliers 72, and outputs the result of the addition as a receiving correlation value.

Figure 6:
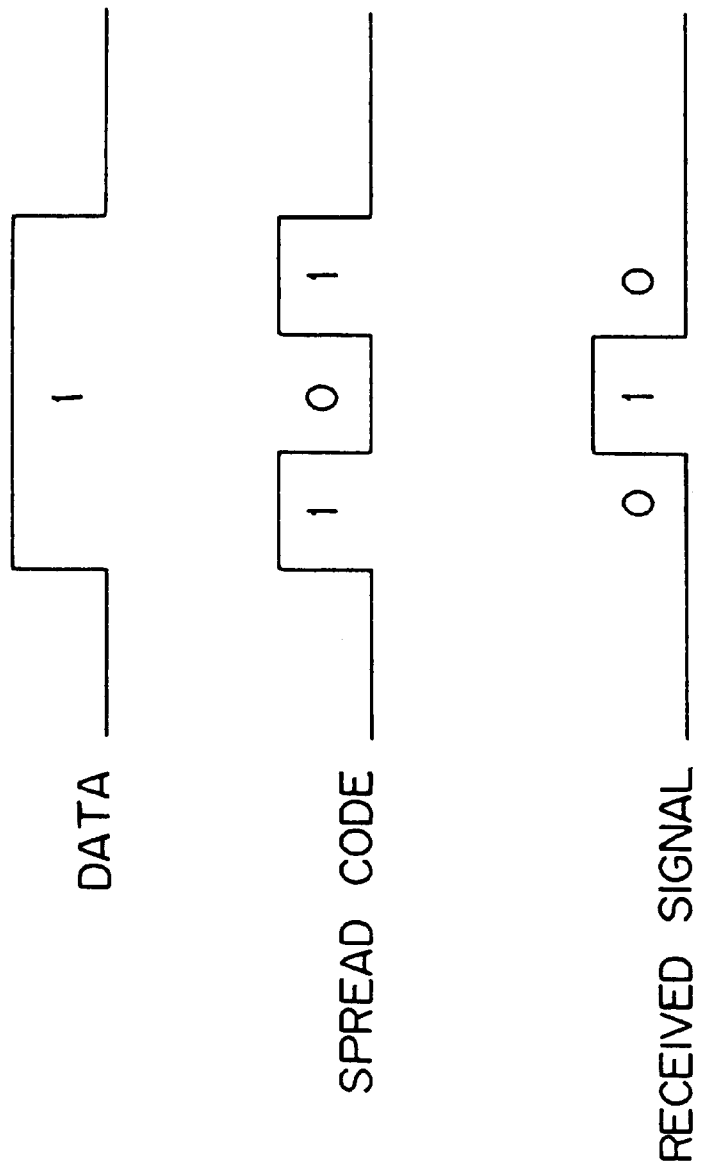
FIG. 6 shows a spread code.

For example, as shown in FIG. 6, when an EXOR of data "1" and a spread code "101" is generated and transmitted from the transmitting side, the received signal becomes "010". When this signal is outputted from the delay unit 71 and the EXOR operation of the signal and a despread code "101" is performed by the multipliers 72, a logic "1" is outputted from each multiplier 72. As a result, the correlation value outputted from the adder 73 becomes "3". Actually, a spread code with a greater number of bits is used, and thereby the matched filter 41 comprises a plurality of FFs and multipliers.

Every time data in the delay unit 71 is shifted by one bit, the correlation value changes. When a despread code is multiplied with the same timing as a spread code is multiplied with on the transmitting side, the peak of the correlation value is formed. Generally speaking, since received signals include signals passing through a plurality of paths and the arriving time of each signal differs depending on a path through which the signal passes, a plurality of peaks are formed as shown in FIG. 7.

Figure 7:
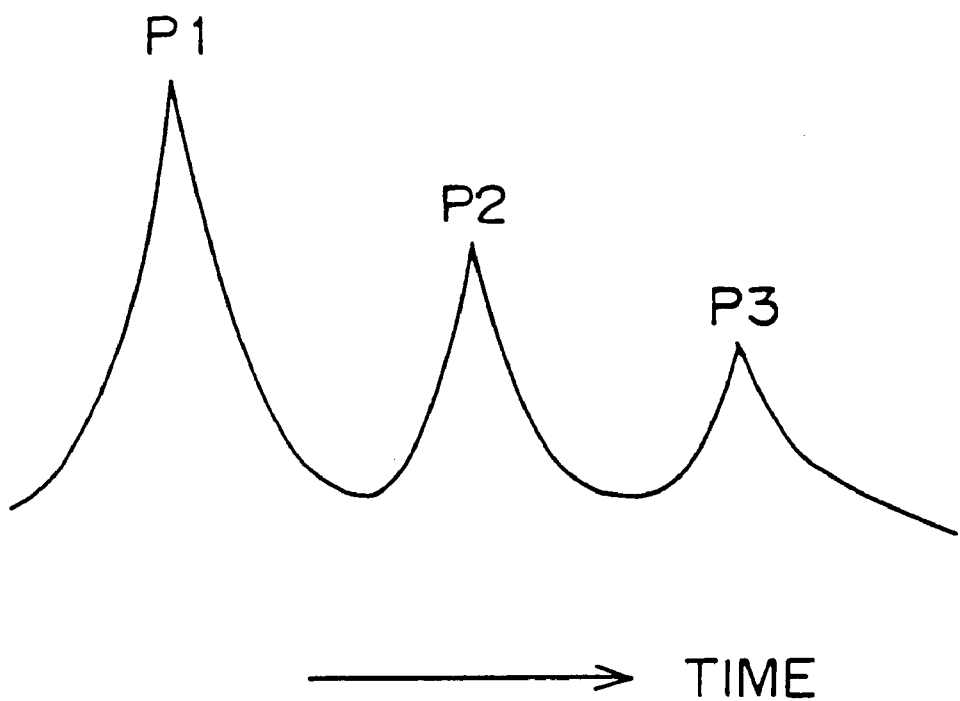
FIG. 7 shows the peaks of the correlation value.

In FIG. 7, the first peak corresponds to the shortest path P1 between a base station and a mobile station, and the second and third peaks correspond to the paths P2 and P3 of a reflected wave or delayed wave. The valid path detector unit 44 shown in FIG. 4 generates a timing signal for a despread corresponding to each path by measuring the difference in time between such peaks. The accumulator unit 42 and profile memory 43 shown in FIG. 4 are provided to enable these peaks to be easily detected.

As shown in FIG. 8, the speed estimation unit 61 shown in FIG. 4 estimates the moving speed of a mobile station in five increments of a speed range of A (stationary state), B (0 to 40 km/h), C (40 to 80 km/h), D (80 to 120 km/h) and E (120 km/h or more), and outputs a control signal corresponding to each speed range to both the searcher start timer 54 and counter initial value setting unit 56. Then, a searcher 25 performs a search operation according to the control signal.

Figure 9:
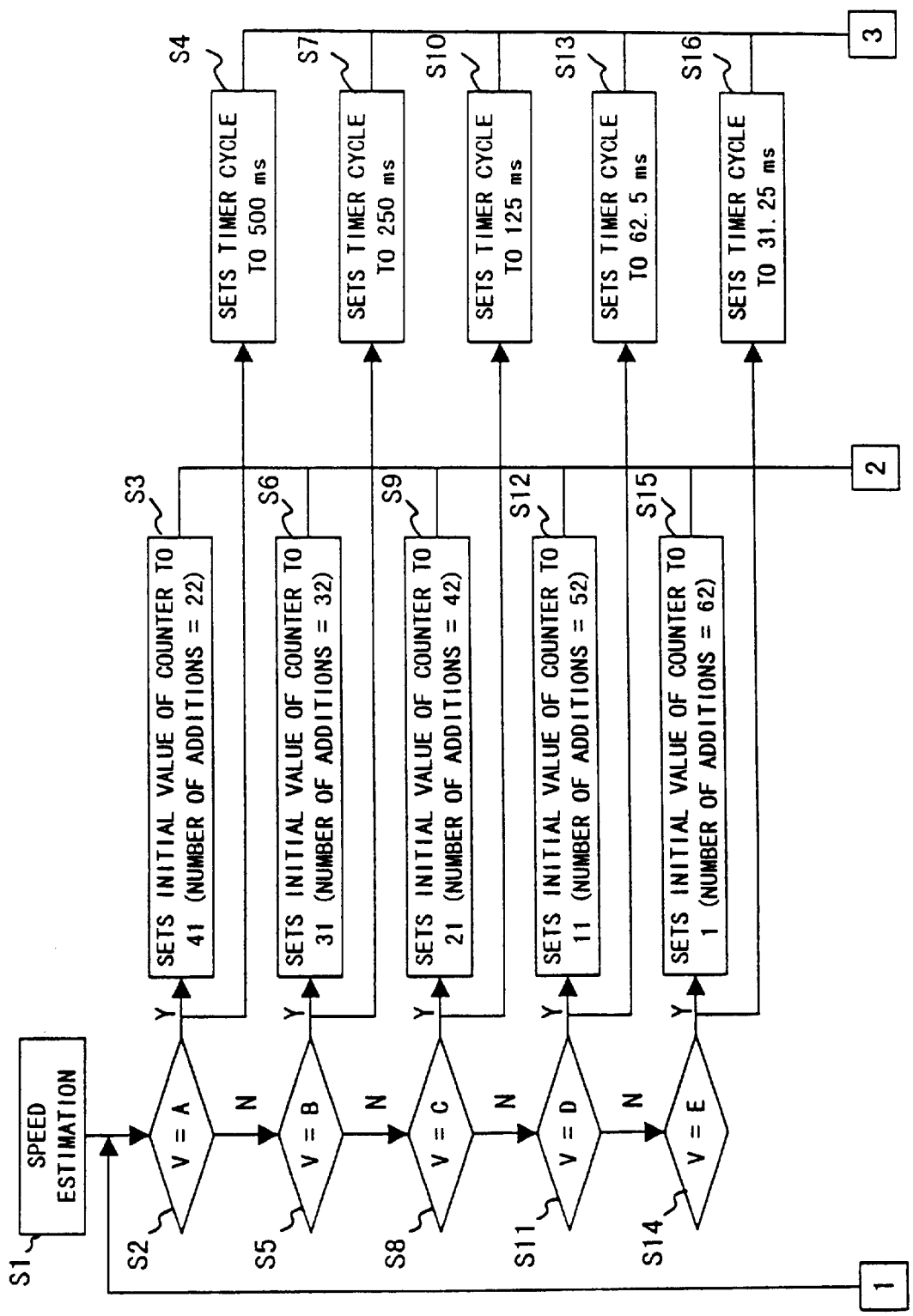
FIG. 9 is a flowchart showing a first search operation (No.1).
Figure 10:
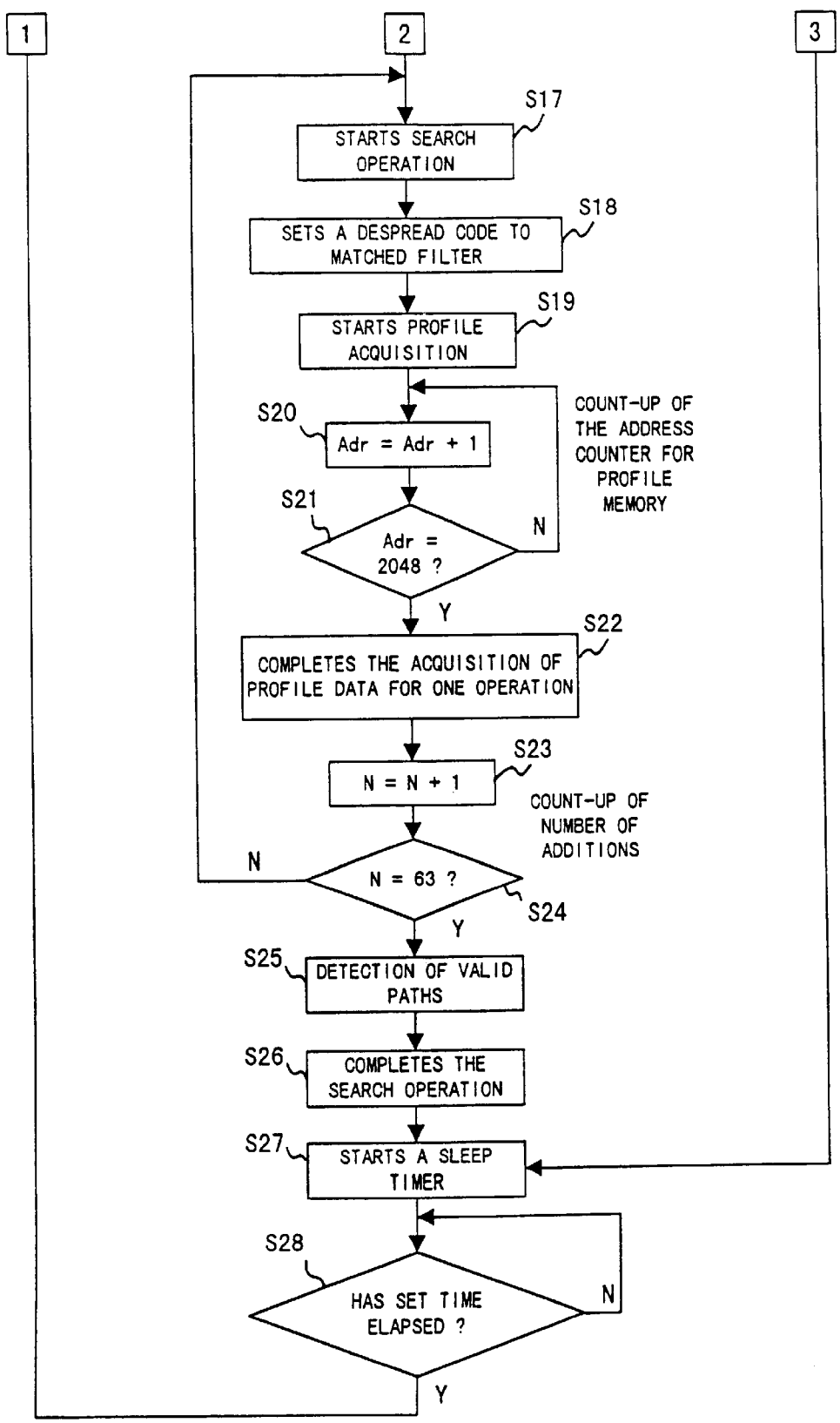
FIG. 10 is a flowchart showing a first search operation (No.2).

FIG. 9 and FIG. 10 are flowcharts showing search operations based on an estimated moving speed. When receiving a control signal from the speed estimation unit 61 (step S1 in FIG. 9), both searcher start timer 54 and counter initial value setting unit 56 judge whether or not a moving speed V corresponds to a stage A (step S2). If the speed V corresponds to the stage A, the initial value setting unit 56 sets the initial value of the counter 53 to 41 (step S3), and the timer 54 sets the timer cycle to 500 ms (step S4).

If the speed V does not correspond to the stage A, then both searcher start timer 54 and counter initial value setting unit 56 judge whether or not the moving speed V corresponds to a stage B (step S5). If the speed V corresponds to the stage B, the initial value setting unit 56 sets the initial value of the counter 53 to 31 (step S6), and the timer 54 sets the timer cycle to 250 ms (step S7).

If the speed V does not correspond to the stage B, then both searcher start timer 54 and counter initial value setting unit 56 judge whether or not the moving speed V corresponds to a stage C (step S8). If the speed V corresponds to the stage C, the initial value setting unit 56 sets the initial value of the counter 53 to 21 (step S9), and the timer 54 sets the timer cycle to 125 ms (step S10).

If the speed V does not correspond to the stage C, then both searcher start timer 54 and counter initial value setting unit 56 judge whether or not the moving speed V corresponds to a stage D (step S11). If the speed V corresponds to the stage D, the initial value setting unit 56 sets the initial value of the counter 53 to 11 (step S12), and the timer 54 sets the timer cycle to 62.5 ms (step S13).

If the speed V does not correspond to the stage D, then both searcher start timer 54 and counter initial value setting unit 56 judge whether or not the moving speed V corresponds to a stage E (step S14). If the speed V corresponds to the stage E, the initial value setting unit 56 sets the initial value of the counter 53 to 1 (step S15), and the timer 54 sets the timer cycle to 31.25 ms (step S16).

When both the initial value of the counter 53 and the cycle of the timer 54 are set, the searcher 25 starts a search operation (step S17 in FIG. 10). First, the code generator unit 51 sets a despread code to the matched filter 41 (step S18), and the profile memory 43 starts to acquire the profile data of a correlation value (correlation values within a certain time period) outputted from the matched filter 41 (step S19).

At this time, the address counter of the memory address generator unit 52 increments an address Adr until the value of the address Adr reaches 2048, and outputs the address Adr to the profile memory 43 (steps S20, S21). The profile memory 43 stores the correlation values in addresses in the order designated by the address Adr. Then, when the address Adr reaches 2048, the address counter of the memory address generator unit 52 completes the acquisition of profile data for one operation (step S22).

Then, the counter 53 increments the count value N of the accumulation additions by one (step S23), and judges whether or not the value N reaches 63 (step S24). In this embodiment, for the counter 53 a 6-bit counter is used, and the final value is 63 (=$2^6$–1). The initial value of N is set in one of steps S3, S6, S9, S12 and S15. If the value N is less than 63, the operations in steps 17 and after are repeated, and the accumulation is performed by the accumulator unit 42.

In this case, the initial values 41, 31, 21, 11 and 1 correspond to the number of the accumulation additions 22, 32, 42, 52 and 62, respectively, and it is clear that the higher the speed V is, the greater is the number that is set.

When the value reaches 63, the valid path detector unit 44 extracts one or more peaks corresponding to a valid path from the accumulated value stored in the profile memory 43, and outputs a control signal indicating the timing of each peak (step S25).

When the search operation is completed in this way (step S26), the timer 54 (sleep timer) is started by a control signal (pulse) from the counter 53 (step S27), and a search operation is not performed until a time set by one of steps S4, S7, S10, S13 and S16 elapses (step S28).

Then, when the set time elapses, operations in steps S2 and after are repeated according to the moving speed at that time. In this case, since the higher the speed V is, the shorter is the cycle time of the timer 54 set to, and the higher the speed V is, the higher the search frequency becomes.

By the way, when a base station is configured to communicate with a plurality of mobile stations (channels), the path timing detection of these channels is also available by the time division operation of one searcher.

Figure 11:
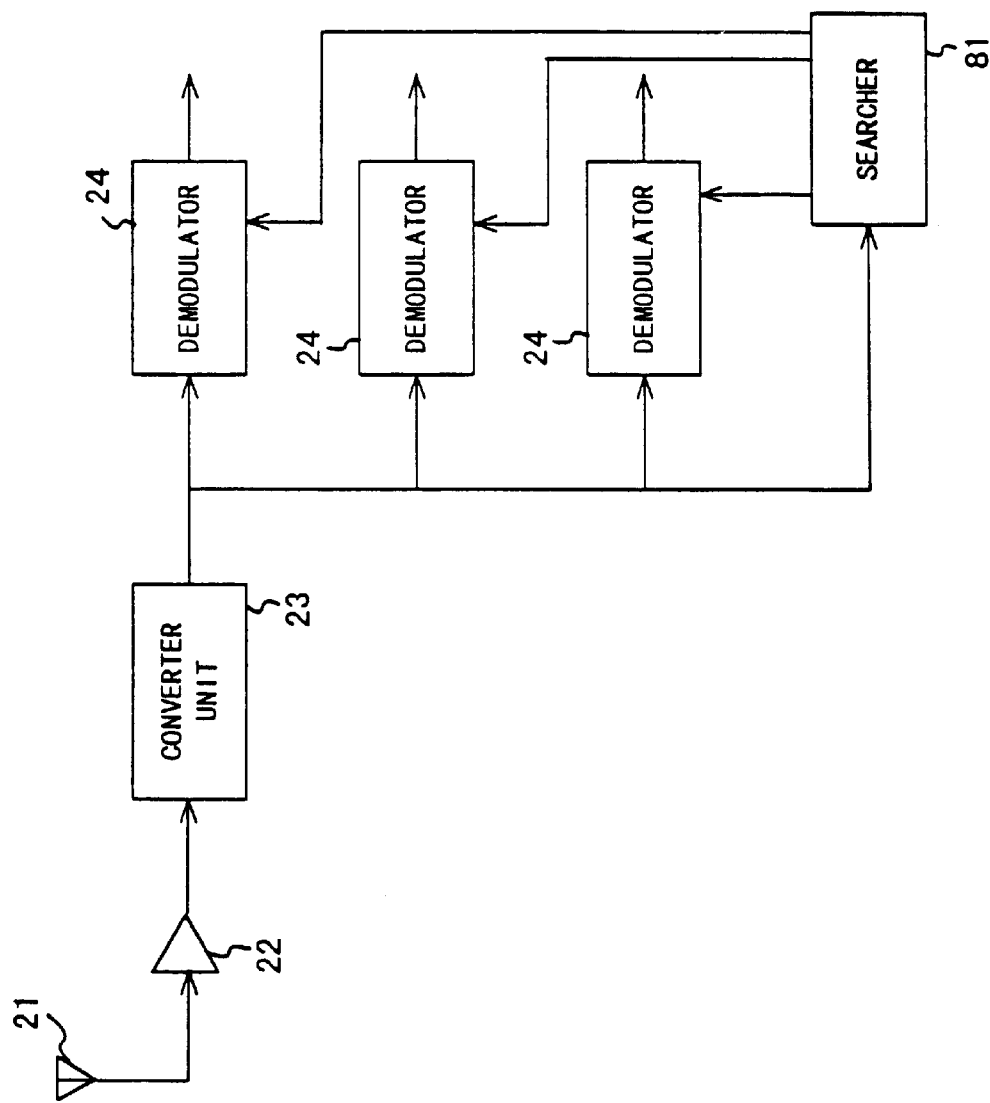
FIG. 11 shows the principle of a second receiver.

FIG. 11 shows the principle of a receiver for performing such a search operation. Both configurations and operations of an antenna 21, an amplifier 22, a converter unit 23 and each of demodulators 24 in FIG. 11 are the same as the configurations and operations shown in FIG. 3. Each demodulator unit 24 demodulates received signals using a despread code corresponding to each channel.

In a normal operation mode a searcher 81 performs a search operation for each channel with the same frequency in order. However, since it cannot be considered that each mobile station travels at the same speed, each channel differs in the path fluctuation. Thus, a search frequency is optimized for each channel based on the estimated moving speed of each mobile station.

In this case, the search frequency of a channel with a low moving speed is set to a small number, since at that time the timing of despreading changes little. Meanwhile, the search frequency of a channel with a high moving speed is set to a large number, since at that time the timing of despreading changes rapidly, in a similar manner to the searcher 25 shown in FIG. 3.

The searcher 81 can also optimize the number of the accumulation additions for each channel based on the estimated moving speed, in the same manner as the searcher 25. In this case, the number of the accumulation additions of a channel with a low moving speed is set to a small number, since at that time there is little path fluctuation. Meanwhile, the number of the accumulation additions of a channel with a high moving speed is set to a large number, since at that time there is a lot of path fluctuation, in a similar manner to the searcher 25.

By such a control, both the optimal search frequency and the optimal number of the accumulation additions set for the path fluctuation of each channel. Since a search is not performed at a higher frequency than is needed, the detection time can be reduced, and time to search a plurality of channels can be secured by one searcher.

FIG. 12 shows a configuration example of the searcher 81 in the case where the number of the accumulation additions is optimized for each channel. Although the case of three channels CH1, CH2 and CH3 is described here, the same is true in the case of more than three channels.

In FIG. 12, a matched filter 92 generates a correlation value for a desired signal from a channel-multiplexed input signal. An accumulator unit 93 accumulates the correlation values, and stores the accumulated value in a profile memory 94. A valid path detector unit 95 extracts one or more peaks corresponding to a valid path from the accumulated values stored in a profile memory 94, and outputs these path timings to the demodulator 24 of the corresponding channel, as shown in FIG. 11.

Code generator units 102, 103 and 104 generate despread codes for CH1, CH2 and CH3, respectively, according to a code output start signal from a timing control unit 113, and provide the despread code to the matched filter 92 as multiplication coefficient. A selector 101 outputs the despread codes CH1, CH2 and CH3 to the matched filter 92 selectively, and a selector 105 inputs a code output start signal to the code generator units 102, 103 and 104 selectively.

A memory address generator unit 107 comprises an address counter. The memory address generator unit 107 generates a memory address according to an address counter start signal from the timing control unit 113, and provides the memory address to the profile memory 94 as a write address.

Counters 108, 109 and 110 count the number of the accumulation additions of CH1, CH2 and CH3, respectively, according to a count-up signal, and when the count value reaches a certain value, output a detection start signal to a valid path detector unit 95. A selector 111 inputs a count-up signal to the counters 108, 109 and 110 selectively.

A counter initial value setting unit 114 modifies the initial values of counters 108, 109 and 110 according to the moving speeds of CH1, CH2 and CH3 estimated by speed estimation units 121, 122 and 123, respectively. The selector 115 outputs control signals from the speed estimation units 121, 122 and 123 to the counter initial value setting unit 114 selectively.

A channel selector unit 112 is controlled by the timing control unit 113, and switches selectors 101, 105, 111 and 115. The speed estimation units 121, 122 and 123 estimate the moving speed of a mobile station in five stages of speed ranges, and output control signals corresponding to each speed range in the same way as the speed estimation unit 61 shown in FIG. 4.

Figure 13:
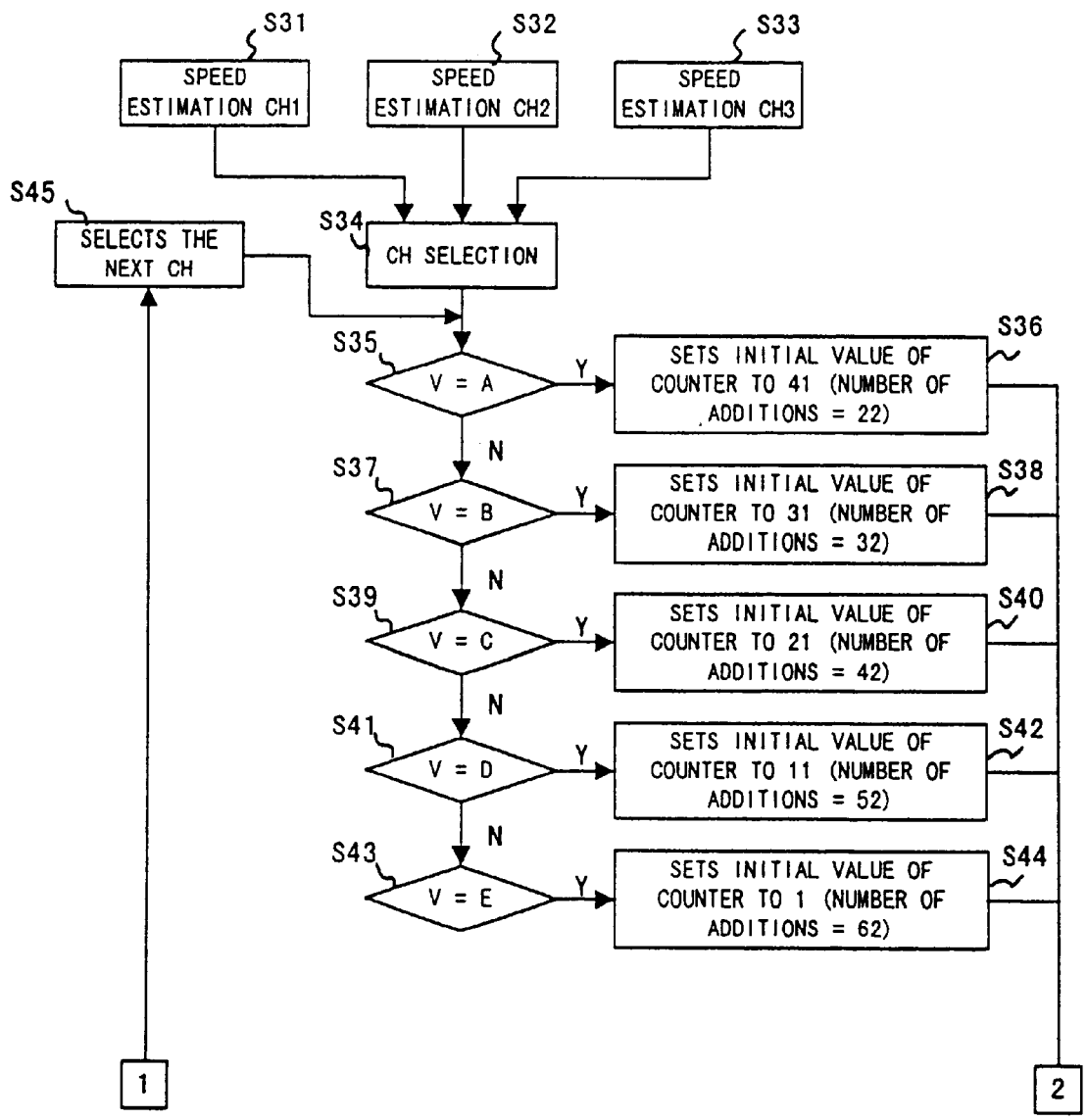
FIG. 13 is a flowchart showing a second search operation (No.1).
Figure 14:
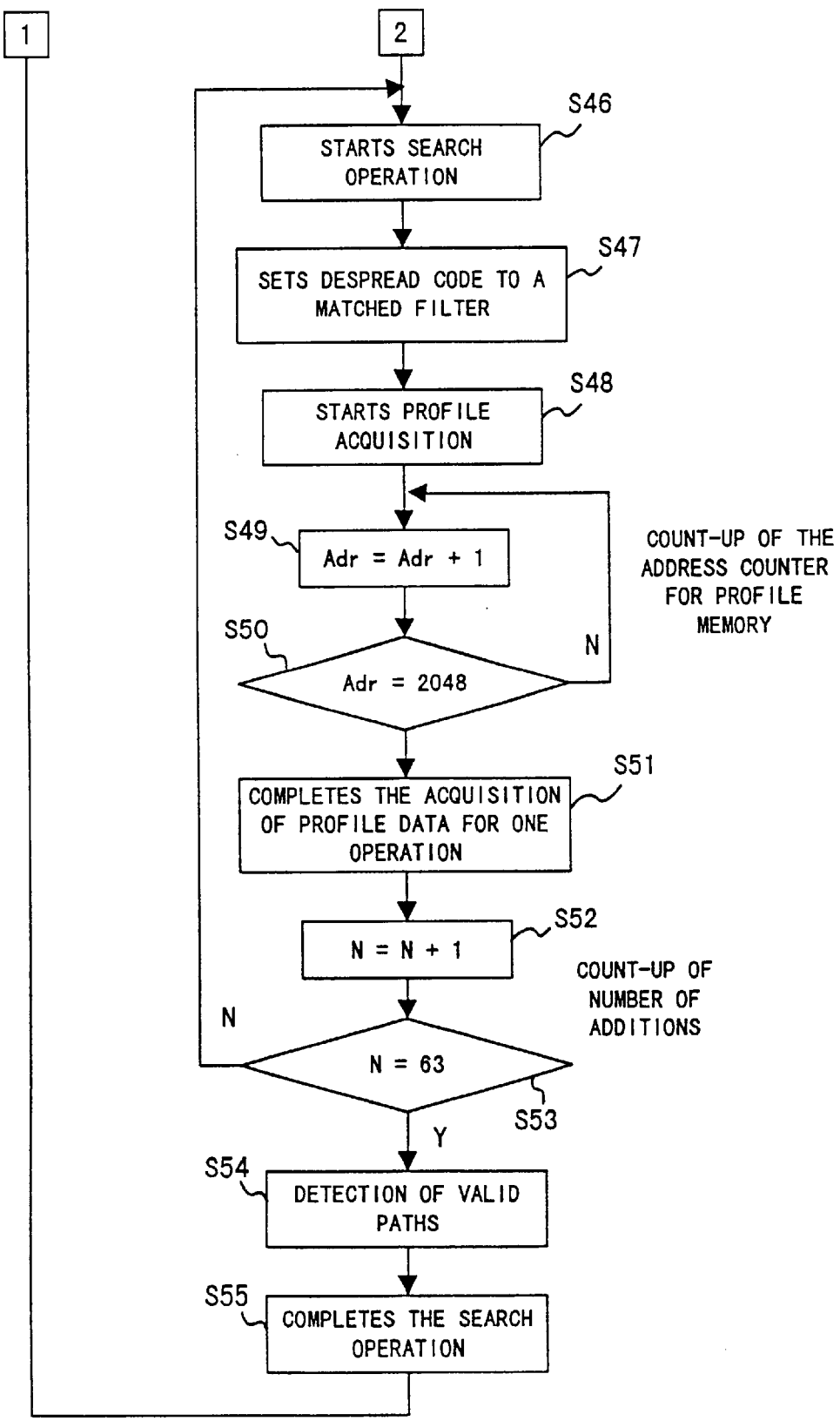
FIG. 14 is a flowchart showing a second search operation (No.2).

FIGS. 13 and 14 are flowcharts showing the search operation of a searcher 81. When receiving a control signal from one of the speed estimation units 121, 122 and 123 (steps S31, S32 and S33 in FIG. 13), the channel selector unit 112 controls the selectors 101, 105, 111 and 115 so as to select each corresponding channel (step S34).

Then, the counter initial value setting unit 114 judges whether or not a moving speed V corresponds to a stage A (step S35). If the speed V corresponds to the stage A, the counter initial value setting unit 114 sets the initial value of the counter (108, 109 or 110) of a corresponding channel to 41 (step S36).

If the speed V does not correspond to the stage A, then the counter initial value setting unit 114 judges whether or not a moving speed V corresponds to a stage B (step S37). If the speed V corresponds to the stage B, the counter initial value setting unit 114 sets the initial value of the counter to 31 (step S38).

If the speed V does not correspond to the stage B, then the counter initial value setting unit 114 judges whether or not a moving speed V corresponds to a stage C (step S39). If the speed V corresponds to the stage C, the counter initial value setting unit 114 sets the initial value of the counter to 21 (step S40).

If the speed V does not correspond to the stage C, then the counter initial value setting unit 114 judges whether or not a moving speed V corresponds to a stage D (step S41). If the speed V corresponds to the stage D, the counter initial value setting unit 114 sets the initial value of the counter to 11 (step S42).

If the speed V does not correspond to the stage D, then the counter initial value setting unit 114 judges whether or not a moving speed V corresponds to a stage E (step S43). If the speed V corresponds to the stage E, the counter initial value setting unit 114 sets the initial value of the counter to 1 (step S44).

When the initial value of the counter is set in this way, the searcher 81 starts a search operation (step S46 in FIG. 14). First, the code generator unit (102, 103 or 104) of a corresponding channel sets a despread code in the matched filter 92 (step S47), and the profile memory 94 starts to acquire the profile data of a correlation value outputted from the matched filter 92 (step S48).

In this case, the address counter of the memory address generator unit 107 increments an address Adr until the value of the address Adr reaches 2048, and outputs the address Adr to the profile memory 94 (steps S49, S50). The profile memory 94 stores the correlation values in addresses in order, designated by the address Adr. Then, when the address Adr reaches 2048, the acquisition of profile data for one operation is completed (step S51).

Then, the counter of a corresponding channel increments the count value N of the number of the accumulation additions by one (step S52), and judges whether or not the count value N reaches 63 (step S53). The initial value of N is set in one of the steps S36, S38, S40, S42 and S44. If the value N is less than 63, operations in steps S46 and after are repeated, and the accumulation is performed by the accumulator unit 93.

When the value N reaches 63, the valid path detector unit 95 extracts one or more peaks corresponding to a valid path from the accumulated values stored in the profile memory 94, and outputs a control signal indicating the timing of each peak (step S54).

When in this way the search operation is completed (step S55), the channel selector unit 112 selects the next channel (step S45 in FIG. 13), and operations in steps S35 and after are repeated according to the moving speed.

Although in FIGS. 9, 10, 13 and 14 the initial values of the counters 53, 108, 109 and 110 are set according to the moving speed V, instead of the initial values, the final values can also be set in the number of the accumulation additions according to the speed V with the initial values of these counters set to 0.

Next, an embodiment for optimizing the parameter for a pilot signal inserted type absolute synchronous detector circuit used in a receiver using an estimated moving speed is described below. For example, when performing the coherent detection of signals in the detector unit 33 shown in FIG. 3, a phase estimation is needed. In the inserted type synchronous detector circuit a phase estimation is performed using a pilot signal being a known signal.

Figure 15:
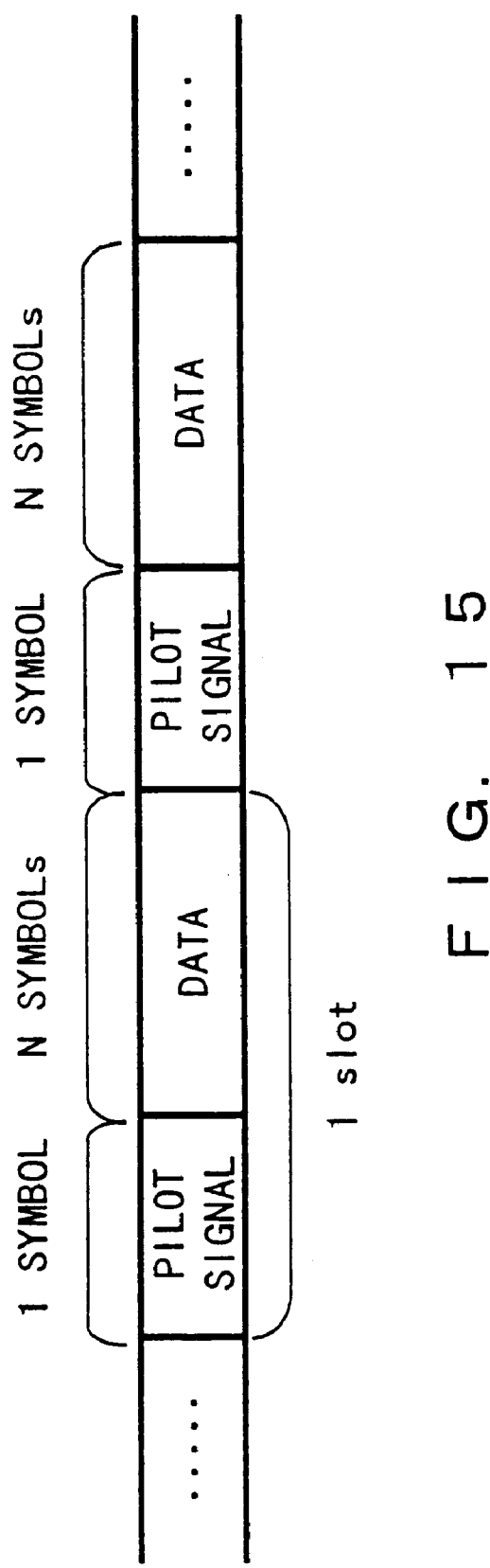
FIG. 15 shows a pilot signal.

FIG. 15 shows a signal to be transmitted with a pilot signal inserted. In this embodiment, one symbol of a pilot signal is inserted before N symbols of data, and forms one slot of signals with the N symbols of data.

Generally speaking, the greater the number of pilot signals for observing a phase estimation is, the more the SNR and then the estimation accuracy are improved. However, when fading is generated by the moving of a mobile station, phase rotation occurs in the signals, and the phase correlation between a plurality of pilot signals becomes low. For this reason, when performing a phase estimation using a lot of pilot signals distant from each other in terms of time, the estimation accuracy is sometimes degraded.

Therefore, a control is performed to optimize the number of pilots used for a phase estimation based on an estimated moving speed. Since the closer to the stationary state a mobile station is, the smaller the phase rotation becomes, the closer to the stationary state a mobile station is, the more pilot signals are used by the synchronous detector circuit when performing a phase estimation; while the higher the moving speed becomes, the less pilot signals are used when performing a phase estimation.

FIG. 16 shows a configuration example of such an inserted type absolute synchronous detector circuit. In FIG. 16, a pilot/data demultiplexer unit 131 demultiplexes input signals after being despread as shown in FIG. 15 on data signals and pilot signals.

A data delay unit 132 delays data signals by two slots, and outputs the data signals to a multiplier 133. A phase estimation unit 135 generates the estimated phase value of the pilot signals (complex conjugate of the pilot signals) according to a control signal from the speed estimation unit 141, and outputs the estimated phase value to the multiplier 133. The multiplier 133 multiplies the output of the data delay unit 132 by the output of the phase estimation unit 135, and the identification unit 134 identifies data from the result of the multiplication (discretization of data), and outputs the decoded data.

The phase estimation unit 135 comprises a switch control unit 136, a plurality of shift registers 137 (SR), a plurality of switches 138 (SW1, SW2, SW3, SW4 and SW5) and an adder 139 (ADD).

Each shift register 137 comprises, for example, flip-flops, and shifts pilot signals from the pilot/data multiplexer unit 131 by one slot. Each switch 138 is controlled by the switch control unit 136. The switches 138 extract outputted pilot signals or the output of each shift register 137, and output the signals or output to the adder 139. The adder 139 adds the outputs from the switches 138 and outputs the result to the multiplier 133.

According to such a configuration, when the data delay unit 132 outputs a data signal being a target of identification (a target of demodulation), a switch SW3 can input the pilot signal in the same slot as the data signal to the adder 139.

The switch control unit 136 controls each switch 138, for example, by such a logic as shown in FIG. 17. When a control signal from the speed estimation unit 141 corresponds to a speed of 0 km/h (stationary state), the switch control unit 136 turns all switches ON. As a result, five pilot signals inserted before and after the data signal being the identification target are inputted to the adder 139.

When a control signal from the speed estimation unit 141 corresponds to a speed 0 to 80 km/h, the switch control unit 136 turns switches SW2, SW3 and SW4 ON, and turns the remaining switches SW1 and SW5 OFF. As a result, three pilot signals inserted before and after the data signal being the identification target are inputted to the adder 139.

When a control signal from the speed estimation unit 141 corresponds to a speed over 80 km/h, the switch control unit 136 turns only the switch SW3 ON, and turns the remaining switches 138 OFF. As a result, only the pilot signal in the same slot as the data signal being the identification target is inputted to the adder 139.

In this way, in the phase estimation unit 135, the lower an estimated moving speed is, the more pilot signals are used, while the lower the estimated moving speed is, the less pilot signals are used. Thus, the accuracy of a phase estimation can be optimized according to the moving speed.

In the phase estimation unit of such an inserted type absolute synchronous detector circuit, a plurality of pilot signals before and after data being an identification target can also be used with a weight in accordance with the time distance from the data. Conventionally, the weight coefficient of each pilot signal is fixed to a certain value.

However, as described above, when a mobile station travels, phase rotation occurs, and as the moving speed varies, the phase correlation between a plurality of pilot signals fluctuates. For this reason, it is desirable to modify the value of each weight coefficient according to an estimated moving speed. In this embodiment, the closer to a stationary state a mobile station is in, the more flatly a plurality of weight coefficients are set, and the higher the moving speed becomes, the smaller the weight coefficients of pilot signals distant from data being an identification target, are made.

FIG. 18 shows a configuration example of such an inserted type absolute synchronous detector circuit. In FIG. 18, the operations of a pilot/data demultiplexer unit 131, a data delay unit 132, a multiplier 133 and an identification unit 134 are the same as the operations of the circuits shown in FIG. 16.

A phase estimation unit 151 comprises a weight coefficient control unit 152, a plurality of shift registers 153 (SR), a plurality of multipliers 154 and an adder 155 (ADD). The phase estimation unit 151 generates the estimated phase value of pilot signals according to a control signal inputted from a speed estimation unit 141, and outputs the estimated phase value to the multiplier 133.

Each shift register 153 shifts pilot signals inputted from the pilot/data demultiplexer unit 131 by one symbol. Each multiplier 154 multiplies inputted pilot signals or the output of each shift register 153 by weight coefficients (K1, K2, K3, K4 and K5) provided from the weight coefficient control unit 152, and provides the result of the multiplication to the adder 155. The adder 155 sums and outputs those multiplication results.

The weight coefficient control unit 152 sets weight coefficients, for example, as shown in FIG. 19. If a control signal from the speed estimation unit 141 corresponds to a speed of 0 km/h (stationary state), all the coefficients are set to 1.0. As a result, five pilot signals inserted before and after a data signal being an identification target are inputted to the adder 155 with the same weight.

If a control signal from the speed estimation unit 141 corresponds to a speed of 0 to 80 km/h, weight coefficients K2, K3 and K4 are set to 1.0, and the remaining weight coefficients K1 and K5 are set to 0.5. As a result, out of the five pilot signals, three pilot signals close to the data signal being the identification target are inputted to the adder 155 with a weight of 1.0, and the remaining two pilot signals distant from the data signal are inputted to the adder 155 with a weight of 0.5.

If a control signal from the speed estimation unit 141 corresponds to a speed of more than 80 km/h, weight coefficients K3, K2 and K4, and K1 and K5 are set to 1.0, 0.5 and 0.2, respectively. As a result, out of the five pilot signals a pilot signal in the same slot as the data signal being the identification target, pilot signals in the slots just before and after the data signal being the identification target, the remaining pilot signals in the slots next to the slots just before and after the data signal being the identification target, are inputted to the adder 155 with weights 1.0, 0.5 and 0.2, respectively.

In the phase estimation unit 151, in this way, if an estimated moving speed is low, a plurality of weight coefficients are set to values close to each other, while if the estimated moving speed is high, the more distant from the data being the identification target a pilot signal is, the lower a weight coefficient is set. Thus, the accuracy of a phase estimation unit can be optimized according to a moving speed.

If the weight coefficients of some pilot signals distant from data being the identification target are set to 0, the number of pilot signals used for phase estimation can be modified like the phase estimation unit 135 shown in FIG. 16.

In the receiver of a DS-CDMA system, the receiving characteristic can be improved by demultiplexing received signals to signals corresponding to each path in a despread process and combining the signals after a coherent detection. A function like this is called rake combining, and for the combining method a maximum ratio combining, etc. is used. In this case, all the demultiplexed signals for each path do not necessarily have the same strength, and there are meaninglessly weak signals even if being combined. There is also a possibility that signals consisting completely of only noise generated by the incorrect timing of despreading due to a wrong search exist.

First, an invalid path detector unit being a circuit for detecting an invalid path corresponding to these signals is described. Then, an embodiment for optimizing the parameters of the invalid path detector unit according to an estimated moving speed is described.

FIG. 20 shows a configuration example of a receiver comprising an invalid path detector unit. The circuit shown in FIG. 20 corresponds to the demodulator unit 24 shown in FIG. 3, and is provided with a plurality of sets consisting of a despread unit 160, an inserted type synchronous detector unit 161 and an invalid path detector unit 162 corresponding to a plurality of paths. The despread unit 160 reverse-spreads input signals with a timing corresponding to a specific path. The inserted type synchronous detector unit 161 performs a coherent detection using pilot signals, and outputs an obtained signal (receiving correlation value) to the invalid path detector unit 162.

The invalid path detector unit 162 comprises a moving average filter 171, an identification level generator unit 172, a comparator 173 and a selector 174, and outputs signals inputted from the inserted type synchronous detector unit 161 or signals of 0 level to a rake combiner unit 163.

The moving average filter 171 calculates a moving average of input signals for a certain period of time, and the identification level generator unit 172 outputs signals with a predetermined identification level. The comparator 173 compares an input signal A from the moving average filter 171 with an input signal B from the identification level generator unit 172, and outputs a control signal to the selector 174 based on the result of this comparison.

If the signal A is greater than the signal B, a control signal is outputted such that the selector 174 may select an input I1 from the inserted type synchronous detector unit 161, and if the signal A is less than or equal to the signal B, a control signal is outputted such that the selector 174 may select an I2. The input I2 is fixed to a logic "0". The selector 174 outputs a signal with the inputs I1 or I2 selectively according to the control signal.

According to such an invalid path detector unit 162, if the moving average value of a signal is less than or equal to an identification level, the output from the inserted type synchronous detector unit 161 is cut. Accordingly, signals of a low level path are not inputted to the rake combiner unit 163, and only signals of good level paths are inputted to the rake combiner unit 163. The rake combiner unit 163 combines inputted signals from each path. The identification unit 164 performs the data identification of combined signals, and outputs the decoded data.

The shorter the observation time (observation length or filter length) for a receiving correlation value observed by the moving average filter 171 is, the more frequently an invalid path can be rejected. However, the shorter the observation time for a receiving correlation value observed by the moving average filter 171 is, the more possibility there is that the detection accuracy of invalid paths may be degraded. For this reason, it is considered that a filter length for detecting invalid paths is modified according to an estimated moving speed.

A filter length is considered to have an optimal value for each moving speed, and it is desirable to be controlled so as to reject invalid paths in the minimum required time. In this embodiment, the lower the moving speed is, the shorter a filter length is set, since the lower the moving speed is, the less the influence of fading is. Meanwhile, the higher the moving speed is, the longer a filter length is set, since the higher the moving speed is, the greater is the influence of fading.

FIG. 21 shows a configuration example of an invalid path detector unit. In the configuration shown in FIG. 21 a filter length control unit 175 is added to the invalid path detector unit 162, and further a speed estimation unit 181 is provided. The filter length control unit 175 modifies the filter length of the moving average filter 171 according to a control signal from the speed estimation unit 181.

At this time, the filter length control unit 175 sets the filter length, for example, as shown in FIG. 22. If a control signal from the speed estimation unit 181 corresponds to speeds of 0 km/h (stationary state), 0 to 80 km/h and more than 80 km/h, the filter length control unit 175 sets the filter lengths to 5 ms, 10 ms and 15 ms, respectively.

In this way, if an estimated moving speed is low, a short filter length is set, and if the estimated moving speed is high, a long filter length is set. Thus, the accuracy of an invalid path detection can be optimized according to a moving speed.

Figure 23:
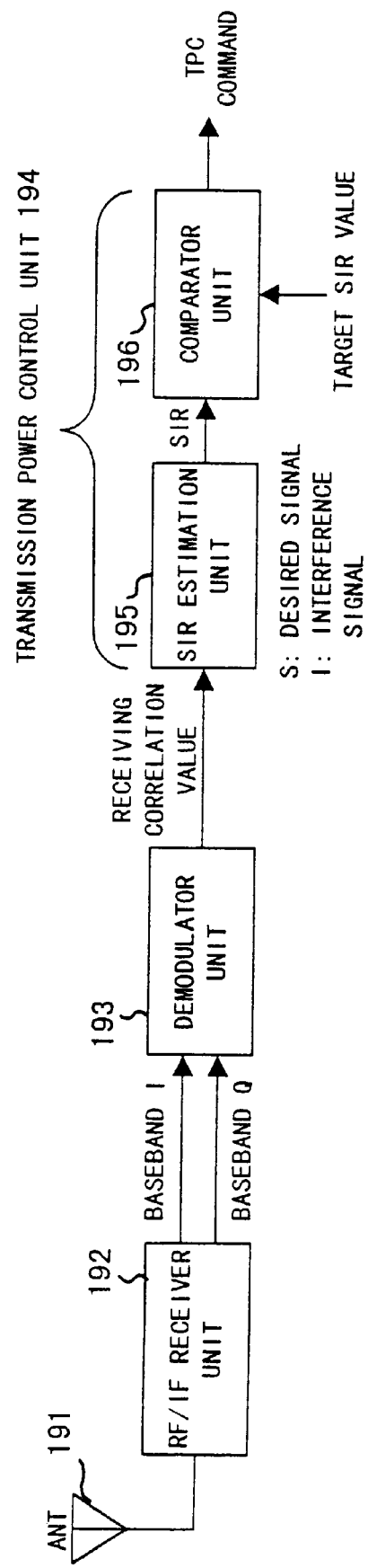
FIG. 23 shows the configuration of the transmission power control unit of the receiver.

In a DS-CDMA system, for example, a transmission power control as shown in FIG. 23 is performed in the transmission power control unit on the receiving side against fading generated due to the differences in distance and the multi-path transmission line between a base station and a mobile station.

In FIG. 23, an antenna 191, a receiver unit 192 and a demodulator unit 193 correspond to the antenna 21 shown in FIG. 3, the amplifier 22 and converter unit 23 shown in FIG. 3, and the demodulator unit 24 shown in FIG. 3, respectively. The demodulator unit 193 performs both despreading and rake combining of baseband signals, and outputs a receiving correlation value. A receiving correlation value means a signal after being reverse-spread.

A transmission power control unit 194 comprises an SIR estimation unit 195 and a comparator unit 196. The SIR estimation unit 195 estimates the signal-to-interference ratio (SIR) from the receiving correlation value, and the comparator unit 196 compares the estimated SIR value with a target SIR value. If the estimated SIR value is greater than the target SIR value, the comparator unit 196 generates a TPC command to reduce the transmission power. If the estimated SIR value is smaller than the target SIR value, the comparator unit 196 generates a TPC command to increase the transmission power. Then, the transmission power control unit 194 transmits the TPC command to the transmitting side, and controls the transmission power.

Figure 24:
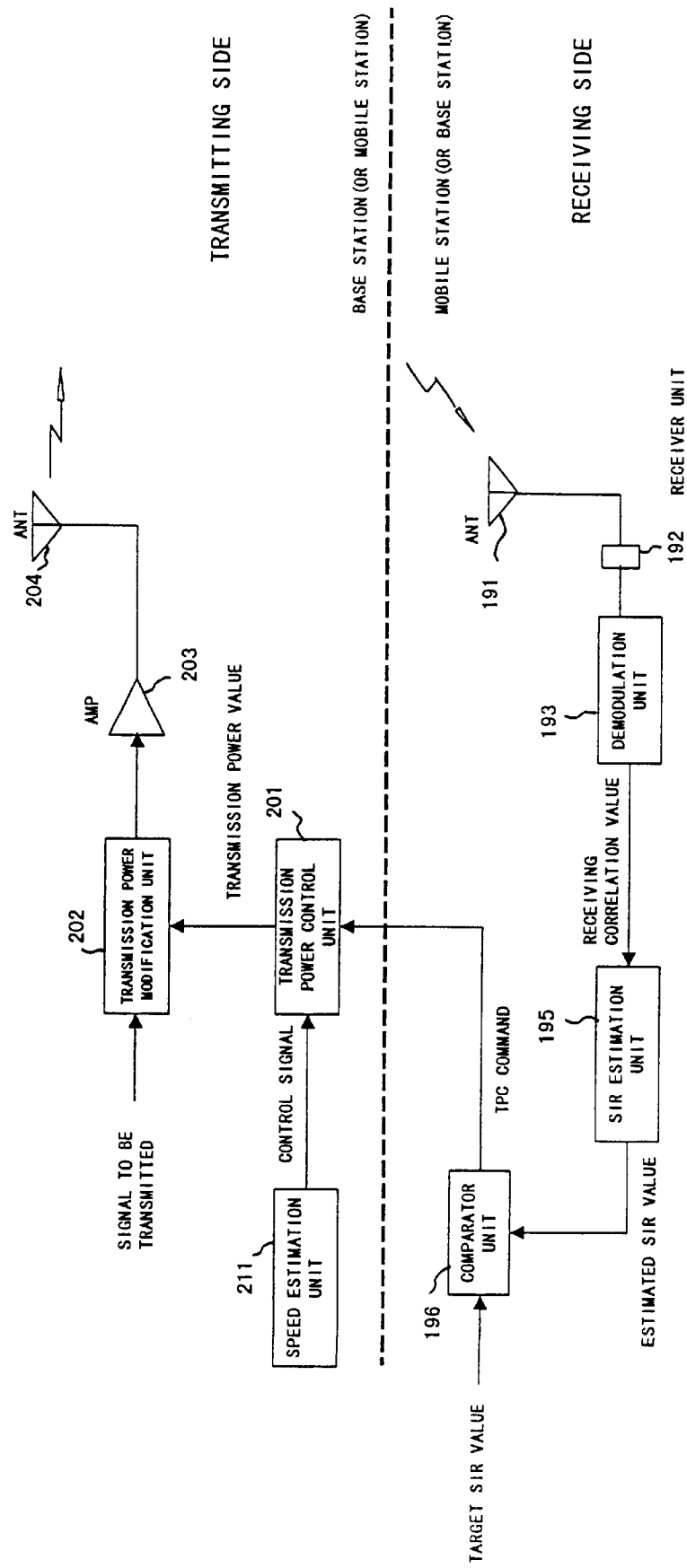
FIG. 24 shows a transmission power control method.

FIG. 24 shows a transmission power control using a TPC command generated on the receiving side. When a transmission power control unit 201 on the transmitting side receives a TPC command from the receiving side, the transmission power control unit 201 increases or reduces the transmission power value according to the TPC command, and provides a corresponding control signal to a transmission power modification unit 202. The transmission power modification unit 202 comprises a variable amplifier, and modifies the transmission power of transmission signals. The transmission signals are transmitted from an antenna 204 to the receiving side through an amplifier 203.

According to such a control, the transmission power of the transmission side can be controlled so that the SIR value of the receiving side may be optimized. However, usually both the variable width (TPC increase/reduction step) of the transmission power value in the transmission power control unit 201 and the modification interval (variable time width) are constant.

However, when a mobile station moves, the fluctuation of SIR becomes rapid, and there is a possibility that a transmission power may not be controlled according to the fluctuation of the SIR of the mobile station using normal TPC increase/reduction step and the variable time width in the base station. For this reason, it is desirable to optimize these parameters according to an estimated moving speed. In this case, the transmission power control unit 201 modifies both the TPC increase/reduction steps and the variable time width according to a control signal from the speed estimation unit 211.

FIG. 25 shows a configuration example of a transmission power control unit 201 for modifying a TPC increase/reduction step according to an estimated moving speed. A TPC command is usually a command of one bit only for instructing increasing or reducing of the transmission power. Command modification units 221, 222 and 223 duplicate an inputted TPC command with a different magnification each, and output the TPC command to a selector 224.

The command modification unit 221 (x1) outputs an inputted command as it is, the command modification unit 222 (x2) makes and outputs double of the inputted command, and the command modifier 223 (x3) makes and outputs triple of the inputted command.

The selector 224 is controlled by a TPC step selection control unit 225, and selectively outputs TPC commands inputted from the command modification units 221, 222 and 223 to a TPC command accumulator unit 226. The command accumulator unit 226 accumulates inputted TPC commands, and the transmission power value conversion table 227 outputs a signal with a transmission power value corresponding to the accumulated value.

For example, if a TPC command to increase the transmission power and a TPC command to reduce the transmission power are indicated by "+1" and "−1", respectively, the TPC command accumulator unit 226 sums the values of TPC commands inputted in succession and in order, and produces a command accumulated value as a result of the accumulation. Then, a transmission power value proportional to this accumulated value is outputted from the transmission power value conversion table 227.

The speed estimation unit 211 estimates a moving speed in three stages of a stationary state, low-speed travel and high-speed travel, and outputs a control signal corresponding to each stage. The TPC step selection control unit 225 enables the selector 224 select an input from the command modification units 221, 222 and 223 when a control signal corresponds to a stationary state, low-speed travel and high-speed travel, respectively.

For example, if the accumulated value "+/−1" of a TPC command corresponds to a 0.5 dB of variable width, against one input of TPC command the command modification units 221, 222 and 223 generate a 0.5 dB, 1.0 dB and 1.5 dB of variable width, respectively.

In this way, if an estimated moving speed is low, a small variable width of the transmission power value is set, while if the estimated moving speed is high, a great variable width of the transmission power value is set. Accordingly, even if the moving speed becomes high, a power transmission can be controlled according to the speed.

A variable time width for modifying the transmission power value can also be controlled according to the moving speed. FIG. 26 shows a configuration example of a transmission power control unit for controlling such a timing.

In FIG. 26, a timing control unit 228 outputs a variable strobe signal according to a control signal inputted from the speed estimation unit 211, and a power value transmission control unit 229 modifies a time interval (variable time width) for outputting a transmission power value from the transmission power value conversion table 227 according to the variable strobe signal.

Here, the closer to a stationary state an estimated moving speed is, the greater a variable time width is set. The higher the estimated moving speed becomes, the smaller a variable time width is set. Thus, the frequency of the case where a transmission power value is modified according to an estimated moving speed is optimized, and even if the estimated moving speed becomes high, a transmission power can be controlled according to the speed.

Next, the configuration and the operation of a speed estimation unit for estimating the moving speed of a mobile station are described below. For the estimation methods of the moving speed there are two methods. That is, one is a method using a TPC command from a mobile station, and the other is a method for using a desired signal power. First, the estimation method using a TPC command is described.

Since the TPC command changes according to an instantaneous fluctuation such as fading, etc., the moving speed can be estimated, only if the change rate of the TPC command is detected. However, since in the case of an extremely-high-speed fading the TPC command cannot follow the instantaneous fluctuation, and the change rate is saturated and becomes constant when the moving speed exceeds a certain level. The area where the change rate of the TPC command is saturated and becomes constant depends on both the variable width and the variable time width of the TPC command.

FIG. 27 shows the configuration for estimating a moving speed using a TPC command generated in a system for controlling a transmission power, as shown in FIG. 24. A fading pitch estimation unit 231 shown in FIG. 27 corresponds to the speed estimation unit 211 shown in FIG. 24, and detects the change of an inputted TPC command.

As described above, if a TPC command is assumed to be one bit of data (+/−1), the fading pitch estimation unit 231 compares two consecutive TPC commands, counts the frequency of the cases where data with the same code continue twice, and the moving speed is estimated based on the count value. Generally speaking, if the moving speed is low, the code of the TPC command does not change frequently. If the moving speed is high, the code is often reversed. Accordingly, the frequency of the case where data with the same code continues tends to increase and decrease, when the moving speed becomes low and high, respectively.

Figure 28:
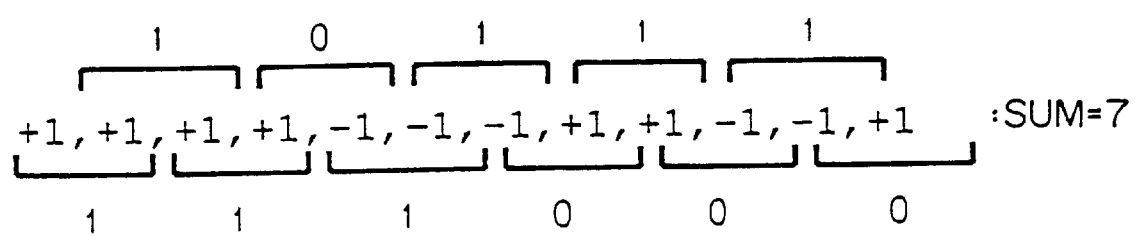
FIG. 28 shows the first count result of a TPC command.
Figure 29:
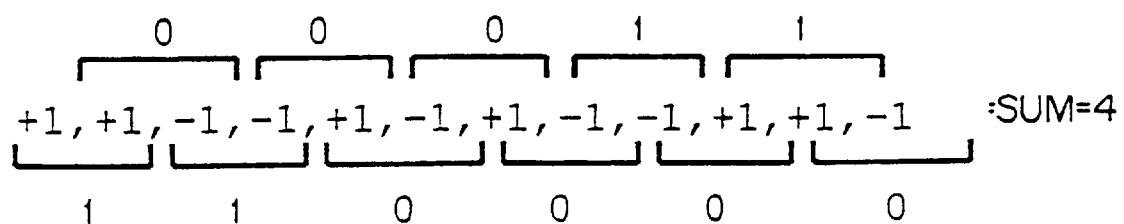
FIG. 29 shows the second count result of a TPC command.

For example, in the TPC command string shown in FIGS. 28 and 29 the count values (SUM) are seven and four, respectively. Accordingly, it is estimated that a moving speed in the state shown in FIG. 29 is higher than the moving speed in the state shown in FIG. 28. A moving speed can also be estimated at a plurality of stages by dividing the range of the count value. A moving speed can also be represented as an appropriate function of the count value.

Figure 30:
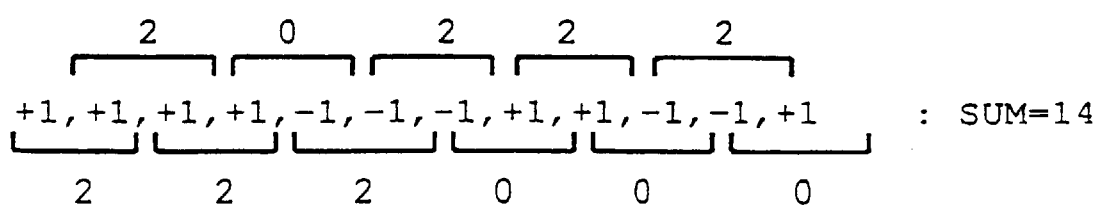
FIG. 30 shows the third count result of a TPC command.
Figure 31:
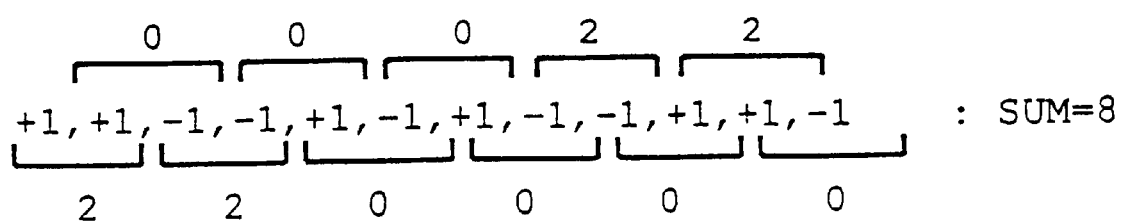
FIG. 31 shows the fourth count result of a TPC command.

FIGS. 30 and 31 show other count methods of the TPC command string shown in FIGS. 28 and 29, respectively. Even if these count methods are adopted, a moving speed can be estimated in the same way as described above.

FIG. 32 shows a configuration example of the fading pitch estimation unit 231 for performing count operations shown in FIGS. 28 and 29. The configuration shown in FIG. 32 comprises a delay unit 241, an EX_NOR gate 242, a moving average filter 243 and a speed conversion memory 245.

The delay unit 241 delays and outputs an inputted TPC command by one sample time. The EX_NOR gate 242 performs an exclusive-NOR operation on the inputted TPC command and the output of the delay unit 241. Thus, the exclusive-NOR signal of the inputted TPC command and the TPC command one sample before is outputted. Accordingly, if the values of two consecutive TPC commands are the same, a logic "1" is outputted. If not, a logic "0" is outputted.

The moving average filter 243 comprises a plurality of delay units 241 and an adder 244. The moving average filter 243 sums the outputs of the EX_NOR gate 242 for a certain time, and outputs the result of the addition as a count value. The speed conversion memory 245 stores a conversion table for converting the count value inputted from the moving average filter 243 to a fading pitch, and outputs the estimated value of the fading pitch using the conversion table.

Figure 33:
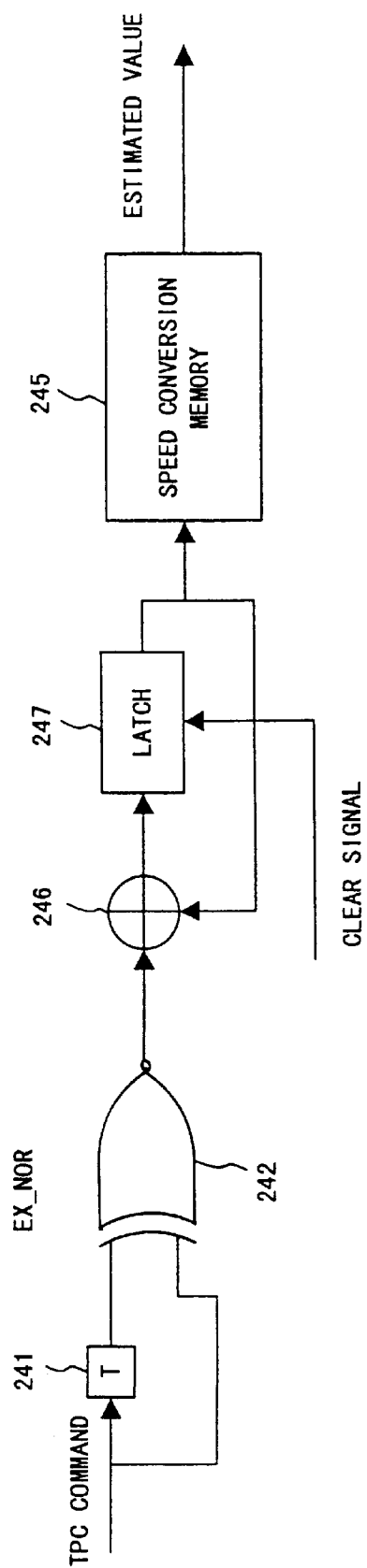
FIG. 33 shows the second configuration example of a fading pitch estimation unit.

The configuration shown in FIG. 33 comprises an integrator consisting of an adder 246 and a latch circuit 247 instead of the moving average filter 243 shown in FIG. 32. The adder 246 repeats a certain number of times an operation for adding the output of the EX_NOR gate 242 to a count value stored in the latch circuit 247, and the latch circuit 247 outputs the count value to a speed conversion memory 245. Thus, the estimated value of the fading pitch is outputted from the speed average conversion memory 245.

The count value can also be converted to a fading pitch using such a circuit as shown in FIG. 34 instead of the speed conversion memory 245. The circuit shown in FIG. 34 comprises four comparators 251 and a decoder 252.

Each comparator 251 compares an inputted count value A with given thresholds B (S1, S2, S3 and S4). If A>B, the comparator 251 outputs a logic "1", and if not, the comparator 251 outputs a logic "0". It is assumed that the thresholds S1, S2, S3 and S4 are determined beforehand based on the relationship between a count value and a fading pitch, and that S1<S2<S3<S4.

The decoder 252 generates a signal corresponding to a fading pitch from the output of each comparator 251. For example, the output of the decoder 252 is indicated with three bits. If a count value≦S1, S1<a count value≦S2, S2<a count value≦S3, S3<a count value≦S4 and S4<a count value, the outputs become "100", "011", "010", "001" and "000", respectively. Accordingly, the greater the count value becomes, the lower the output of the decoder 252 becomes.

In such a speed estimation method, when the transmission frequencies of the TPC commands differ due to differences in system, the frequency of the cases where data with the same code continues twice is not necessarily optimal for the speed estimation. For this reason, this method is generalized, the frequency of the cases where data with the same code continue N times is counted, and a count value optimal for the system is used for the estimation. It is recommended that the greater the transmission frequency of a TPC command is, the greater the value of N is made.

Next, FIG. 35 shows a configuration for estimating a moving speed using the accumulated value of TPC commands. A fading pitch estimation unit 262 shown in FIG. 35 corresponds to the speed estimation unit 211 shown in FIG. 24. The fading pitch estimation unit 262 receives the accumulated value from the TPC command accumulator unit 226 shown in FIG. 25, and estimates the moving speed.

Figure 36:
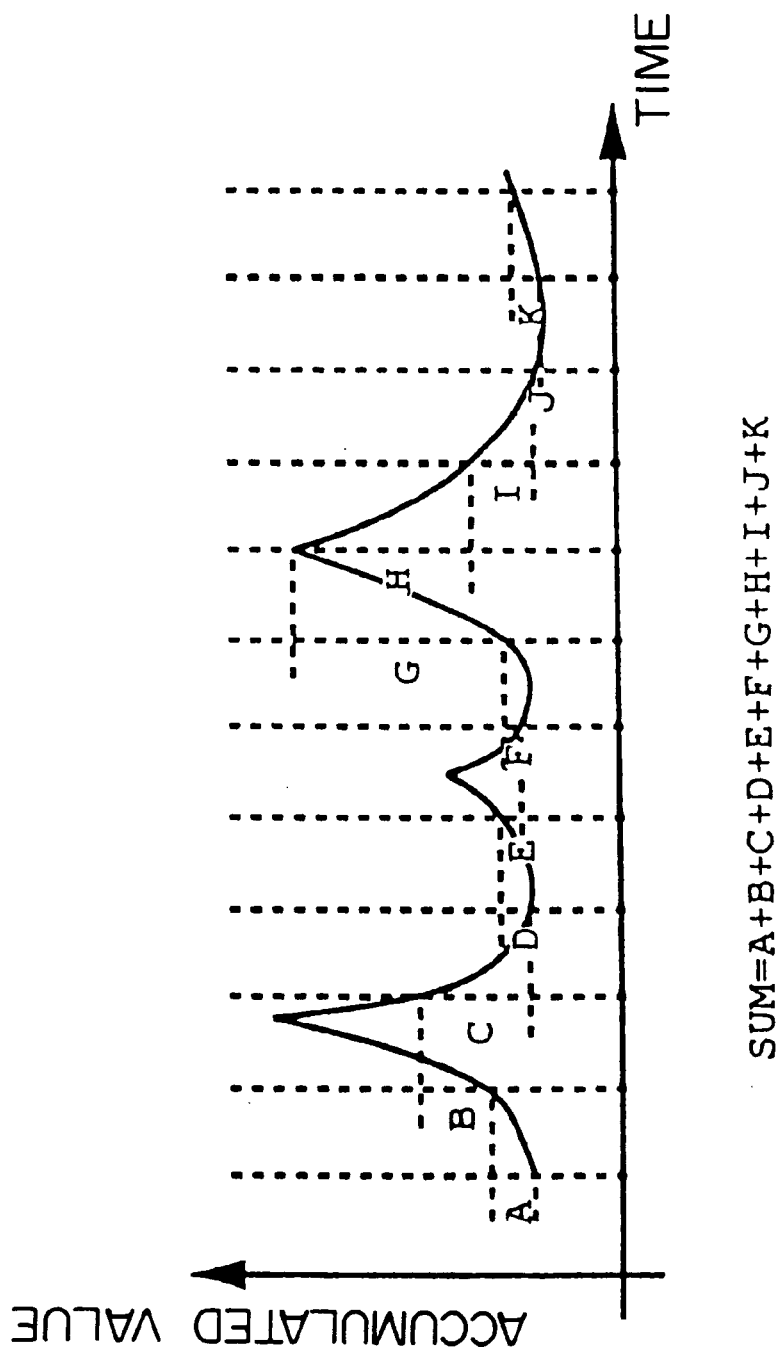
FIG. 36 shows the sampling of accumulated values.

As shown in FIG. 36, the fading pitch estimation unit 262 samples the accumulated values of the TPC command at a certain sampling intervals, sums the absolute values of the differences between two consecutive sample values (A, B, C, D, E, F, G, H, I, J and K) over a certain period of time, and estimates the moving speed from this sum.

The higher the moving speed is, the greater this sum becomes, since the higher the moving speed is, the more rapidly the accumulated value increases or decreases. Meanwhile, the lower the moving speed is, the smaller this sum becomes, since the lower the moving speed is, the more slowly the accumulated value increases or decreases. Accordingly, a moving speed can be estimated at a plurality of stages by dividing the range of the sum of the differences between sample values. A moving speed can also be represented as an appropriate function of the sum.

Figure 37:
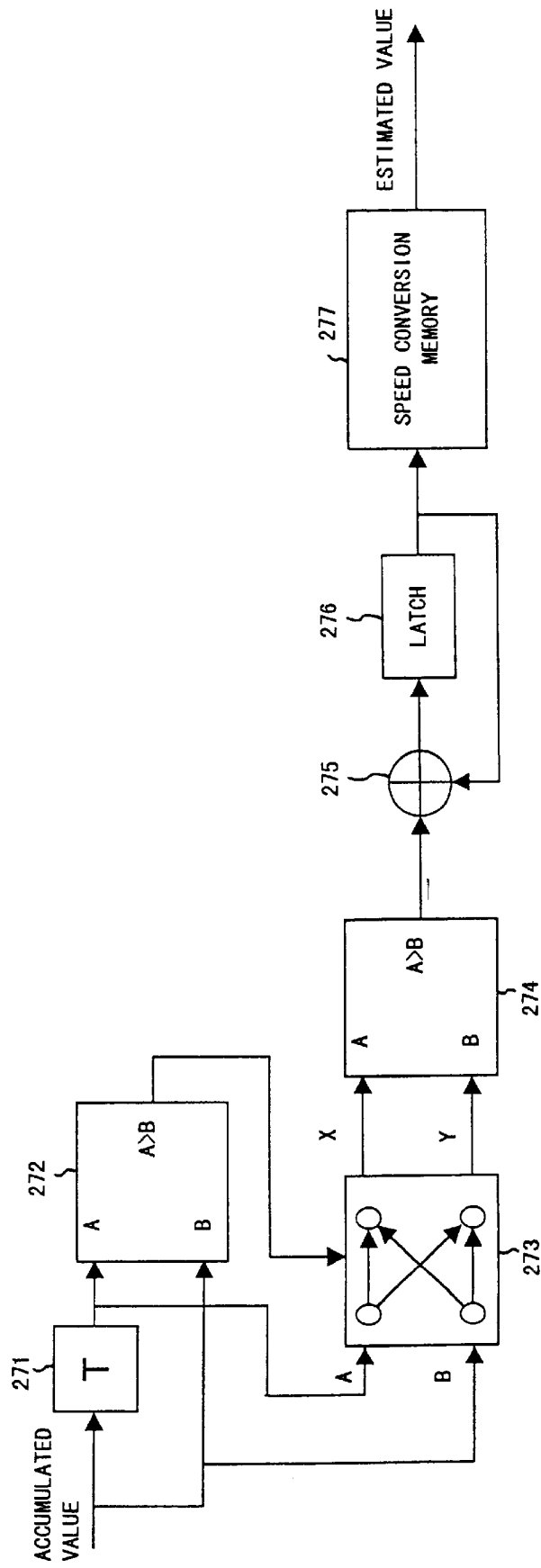
FIG. 37 shows the third configuration example of a fading pitch estimation unit.

FIG. 37 shows a configuration example of the fading pitch estimation unit 262 for performing such an operation. The configuration shown in FIG. 37 comprises a delay unit 271, a comparator 272, a converter circuit 273, a subtracter 274, an adder 275, a latch circuit 276 and a speed conversion memory 277.

The delay unit 271 delays and outputs an inputted accumulated value by one sample time. The comparator 272 compares the in putted accumulated value B with the output A of the delay unit 271. If A>B, the comparator 272 outputs a logic "1", and if not, the comparator 272 outputs a logic "0".

The converter circuit 273 is controlled by the output of the comparator 272. If the output of the comparator 272 is a logic "1", the converter circuit 273 outputs inputs A and B from outputs X and Y, respectively, while if the output of the comparator 272 is a logic "0", the converter circuit 273 outputs inputs A and B from outputs Y and X, respectively. Accordingly, if the inputted accumulated value B is greater than the accumulated value A one sample before, X=B and Y=A, while if the inputted accumulated value B is smaller than the accumulated value A one sample before, X=A and Y=B.

The subtracter 274 subtracts the output Y from the output X of the converter circuit 273, and outputs the balance. Since the output of the converter circuit 273 is always X≧Y. the output of the subtracter 274 always becomes 0 or positive. This output corresponds to the absolute value of the difference between an inputted accumulated value and an accumulated value one sample before.

The adder 275 repeats an operation for adding the output of the subtracter 274 to a sum stored by the latch circuit 276 a certain number of times, and the latch circuit 276 outputs the sum to the speed conversion memory 277. Thus, the estimated value of a fading pitch is outputted from the speed conversion memory 277. Instead of the speed conversion memory 277 the sum can also be converted to an estimated value using a circuit such as shown in FIG. 34.

A moving speed can also be estimated from the average value by measuring the moving average of these values when summing the differences between sample values for a certain period of time. More precise fluctuation of the moving speed can be estimated by measuring the moving average accurately.

Figure 38:
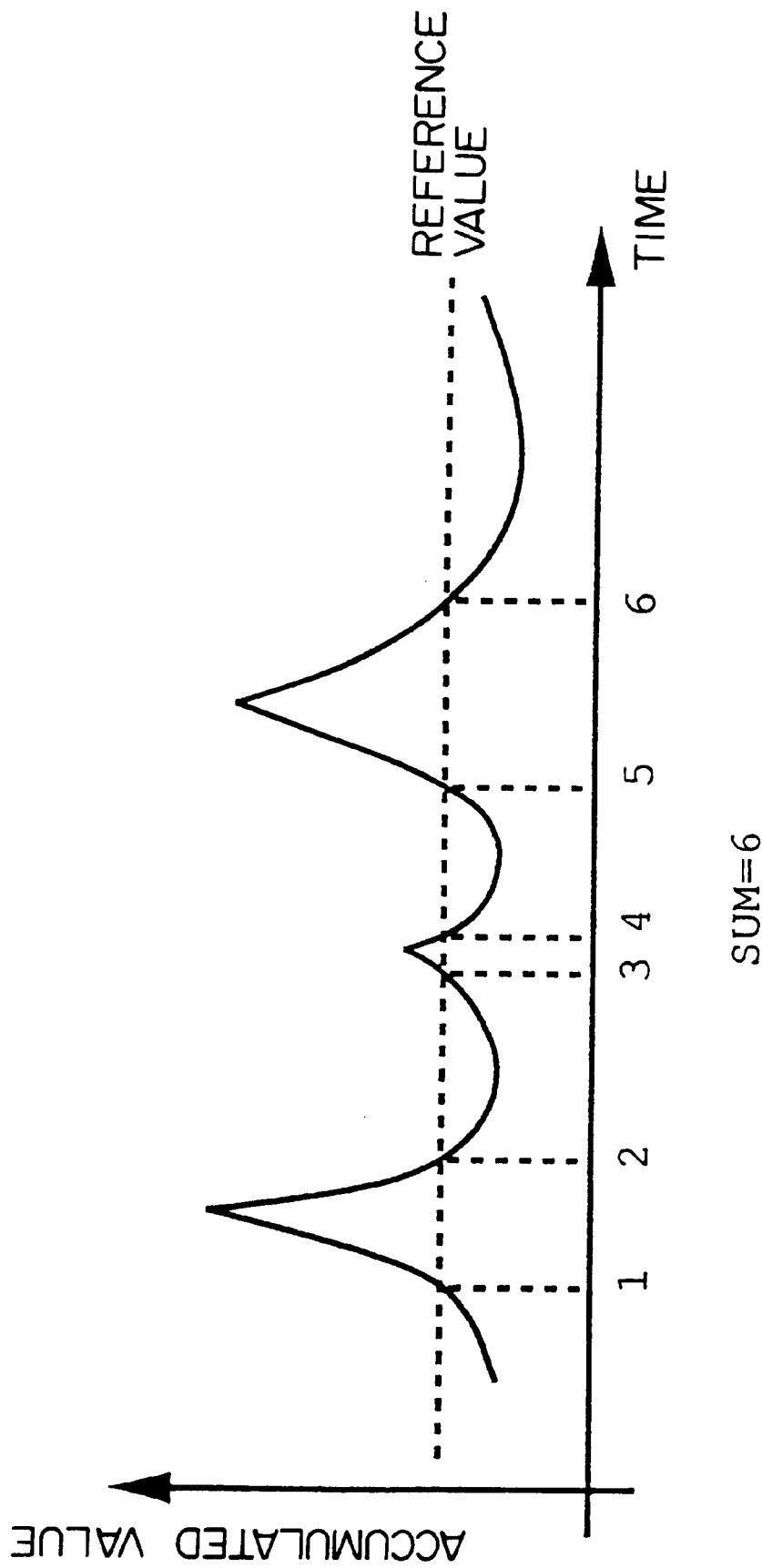
FIG. 38 shows the reference value of the accumulated values of a TPC command.

As shown in FIG. 38, by making the fading pitch estimation unit 262 count the frequency of the cases where the accumulated value of a TPC command crosses a certain reference value, a moving speed can also be estimated from the count value (SUM). An accumulated value crossing a reference value means that the accumulated value becomes greater than the reference value or that the accumulated value becomes smaller than the reference value. The higher the moving speed is, the greater the count value becomes, while the lower the moving speed is, the smaller the count value becomes. Accordingly, by using this count value, a moving speed can be estimated in the same way as the differences between sample values are summed.

Figure 39:
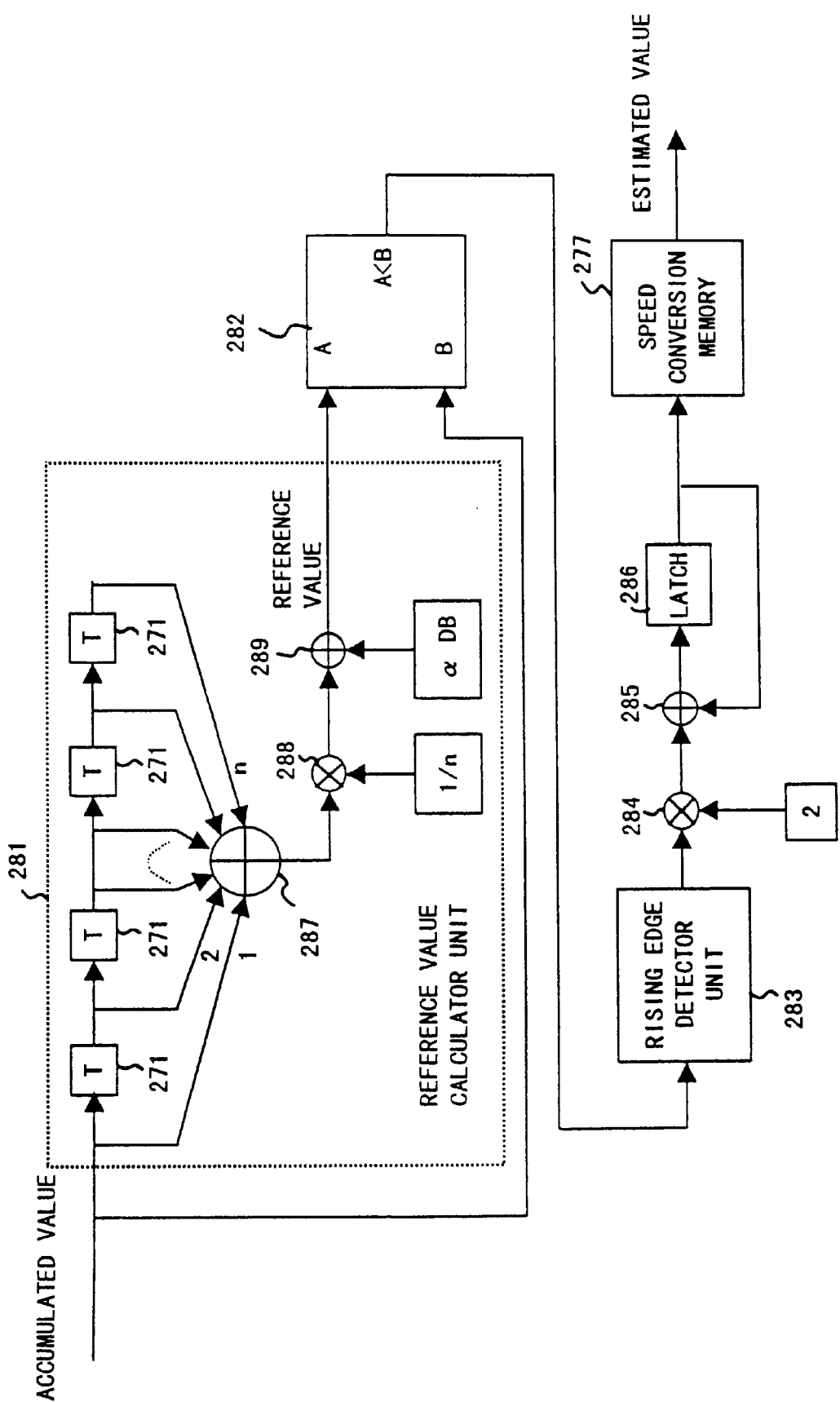
FIG. 39 shows the fourth configuration example of a fading pitch estimation unit.

FIG. 39 shows a configuration example of a fading pitch estimation unit 262 for performing such an operation. The configuration shown in FIG. 39 comprises a reference value calculator unit 281, a comparator 282, a rising edge detector unit 283, a multiplier 284, an adder 285, a latch circuit 286 and a speed conversion memory 277.

In this embodiment the reference value calculator unit 281 further comprises (n−1) delay units 271, an adder 287, a multiplier 288 and an adder 289, and calculates a reference value from the average of n accumulated values. The adder 287 adds an inputted accumulated value and the outputs of (n−1) delay units 271, and the multiplier 288 multiplies the result of the addition by 1/n. The adder 289 adds a certain value α to the result of the multiplication, and generates a reference value.

The comparator 282 compares a reference value A from the reference value calculator unit 281 with an inputted accumulated value B. If A<B, the comparator 282 outputs a logic "1", and if not, the comparator 282 outputs a logic "0". When the output of the comparator 282 changes from a logic "0" to a logic "1", the rising edge detector unit 283 outputs a logic "1". The multiplier 284 multiplies the output of the rising edge detector unit 283 by 2.

The adder 285 repeats an operation for adding the output of the multiplier 284 to a count value stored by the latch circuit 286 a certain number of times, and the latch circuit 286 outputs the count value to the speed conversion memory 277. Thus, double the frequency of the cases where the accumulated value exceeds the reference value for a certain time is outputted as the count value, and this count value corresponds to the frequency of the cases where the accumulated value crosses the reference value.

The speed conversion memory 277 outputs the estimated value of a fading pitch corresponding to an inputted count value. The count value can also be converted to an estimated value using a circuit such as shown in FIG. 34 instead of the speed conversion memory 277.

By measuring the moving average of the count values over a certain period of time when counting the crossing frequency, a moving speed can also be estimated from the average. More precise fluctuation of the moving speed can be estimated by measuring the moving average accurately.

Although all the methods described above are the estimation methods of a moving speed using a TPC command, there is also another method using a desired signal power obtained from a receiving correlation value. In a DS-CDMA system, received signals before being despread are in a state where the spectrum is spread, and a plurality of channels are multiplexed. For this reason, signals affected by fading from a target mobile station cannot be observed until being reverse-spread. However, a target desired signal can be extracted by despreading the signals, the fading can be observed, and thereby the moving speed can be estimated.

Figure 40:
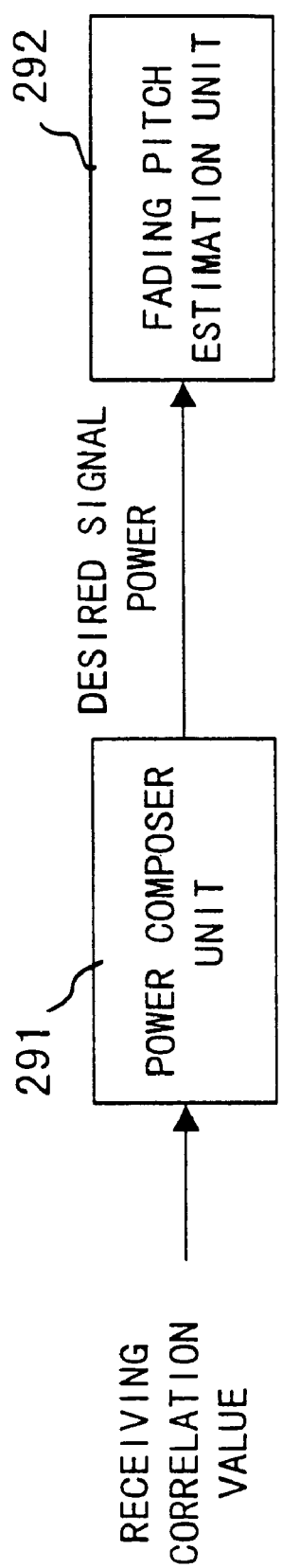
FIG. 40 shows a speed estimation using a desired signal power.

FIG. 40 shows a configuration for estimating the moving speed using a desired signal power. A power composer unit 291 composes a desired signal power using a receiving correlation value corresponding to the output of the demodulator 24 shown in FIG. 3. A fading pitch estimation unit 292 corresponds to a speed estimation unit and estimates a moving speed based on the composed desired signal power.

Figure 41:
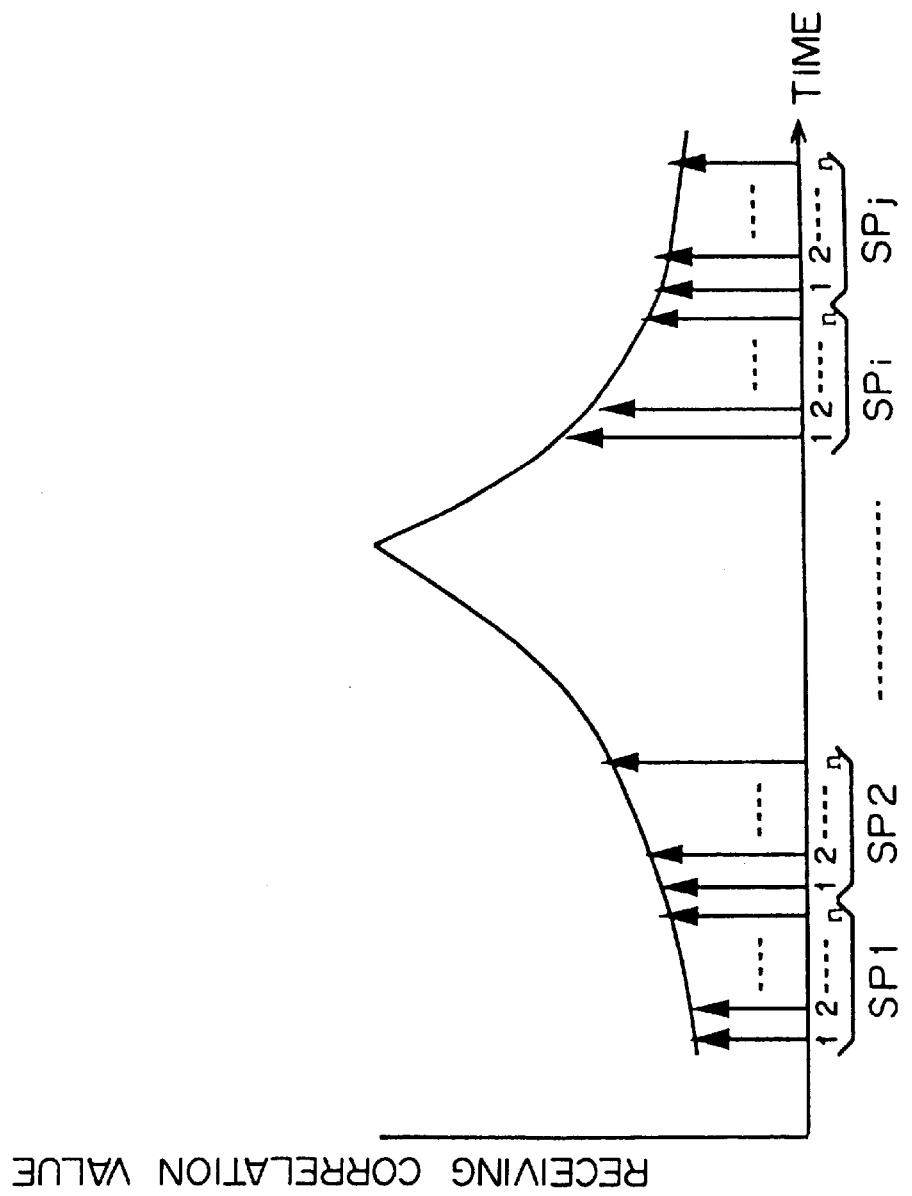
FIG. 41 shows the sampling of a receiving correlation value.

As shown in FIG. 41, the fading pitch estimation unit 292 measures the receiving correlation value, and samples desired signal powers every certain period of time. Each sample value (SP1, SP2, . . . , SPi, SPj) of the desired signal power is generated from n consecutive receiving correlation values (1, 2, . . . n).

Figure 42:
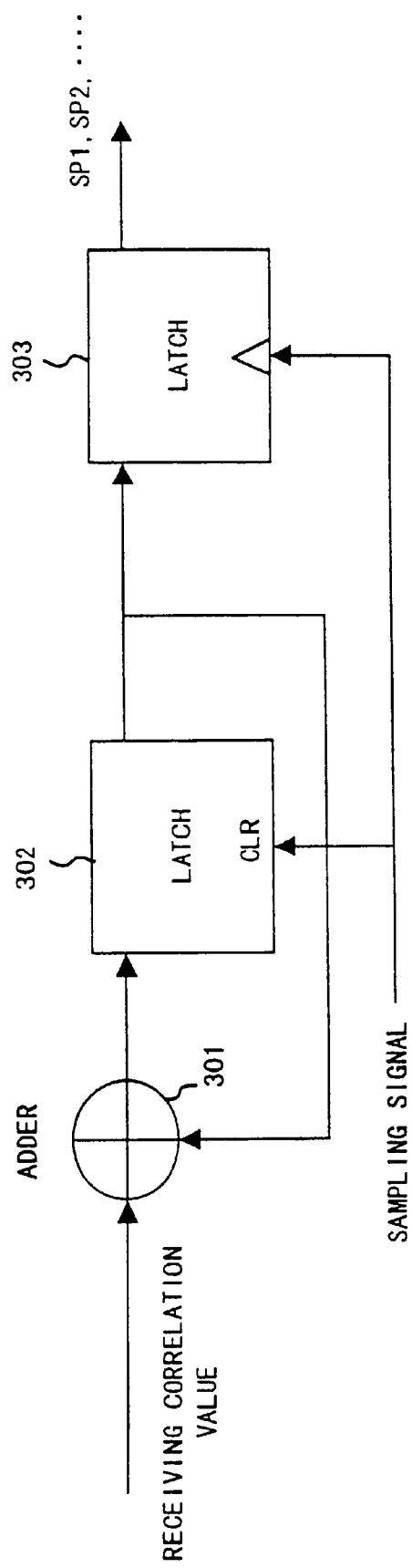
FIG. 42 shows a sampling circuit.

FIG. 42 shows a configuration example of the circuit for performing such a sampling operation. The sampling circuit shown in FIG. 42 comprises an adder 301 and latch circuits 302 and 303, and generates the sample value of a desired signal power.

The adder 301 and the latch circuit 302 integrate n consecutive receiving correlation values, and the latch circuit 302 is cleared each one sample time by a sampling signal. The latch circuit 303 latches the output of the latch circuit 302 for each one sample time by a sampling signal, and outputs a sample value. According to a circuit such as, the sum of n receiving correlation values inputted for one sample time is outputted as a sample value.

Figure 44:
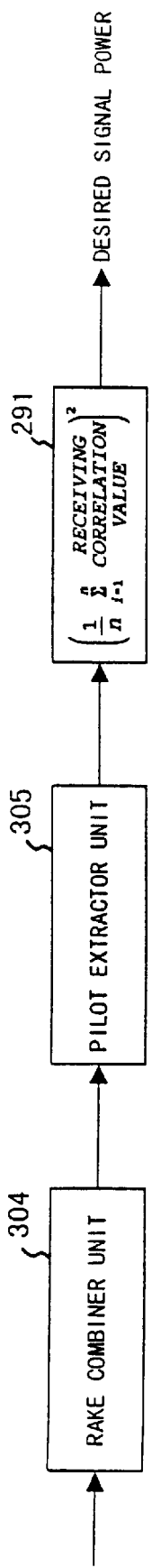
FIG. 44 shows a second power composition.
Figure 45:
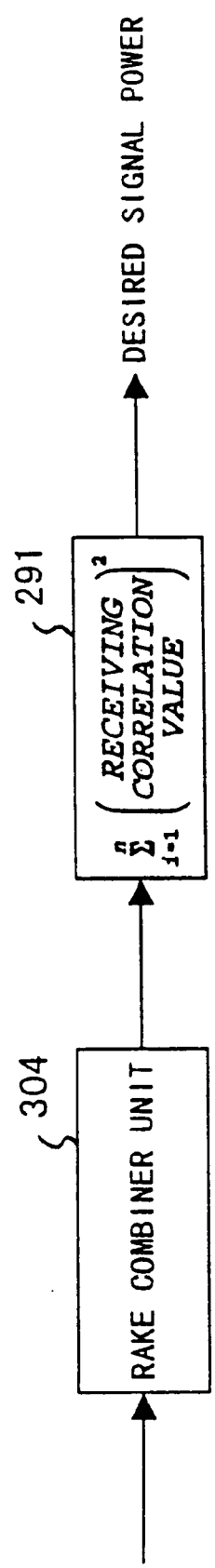
FIG. 45 shows a third power composition.

For example, for a method of generating a desired signal power from the receiving correlation value of signals including a pilot signal as shown in FIG. 15 three methods shown in FIGS. 43, 44, and 45 can be considered.

In FIG. 43, a rake combiner unit 304 outputs the receiving correlation value of a desired signal corresponding to a specific channel, and a pilot extractor unit 305 extracts the receiving correlation value of a pilot signal being a known signal. A power composer unit 291 performs the power composition of the extracted receiving correlation values, and generates the sample value of a desired signal power. In this embodiment a sample value is the sum of n values obtained by squaring n receiving correlation values.

In FIG. 44, a power composer unit 291 performs the amplitude composition of the extracted receiving correlation values, and generates the sample value of a desired signal power. In this embodiment a sample value is obtained by squaring the average value of n receiving correlation values.

In FIG. 45, a pilot signal is not extracted, and a power composition unit 291 performs the power composition of the receiving correlation values of the pilot signal and data signal outputted from the rake combiner unit 304 and generates the sample value of a desired signal power. In this embodiment a sample value is the sum of n values obtained by squaring n receiving correlation values. The method shown in FIG. 45 can be applied to an arbitrary signal regardless of whether or not there is a pilot signal.

Figure 46:
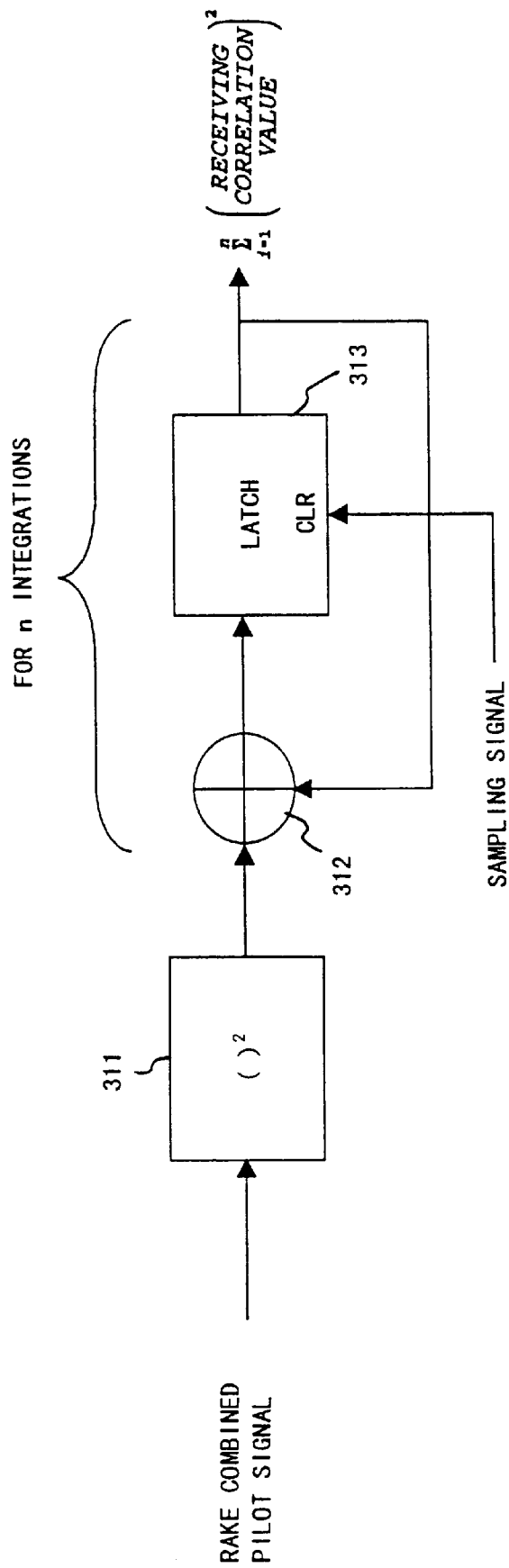
FIG. 46 shows the first configuration example of a power composer unit.

FIG. 46 shows a configuration example of the power composer unit 291 shown in FIG. 43. The configuration shown in FIG. 46 comprises a square generator 311, an adder 312 and a latch circuit 313. The square generator 311 squares an inputted receiving correlation value. The adder 312 and latch circuit 313 integrate the n consecutive outputs from the square generator 311, and output the result of the integration as a sample value. The latch circuit 313 is cleared for each one sample time by a sampling signal. The power composer unit 291 shown in FIG. 45 comprises the same circuits as shown in FIG. 46.

Figure 47:
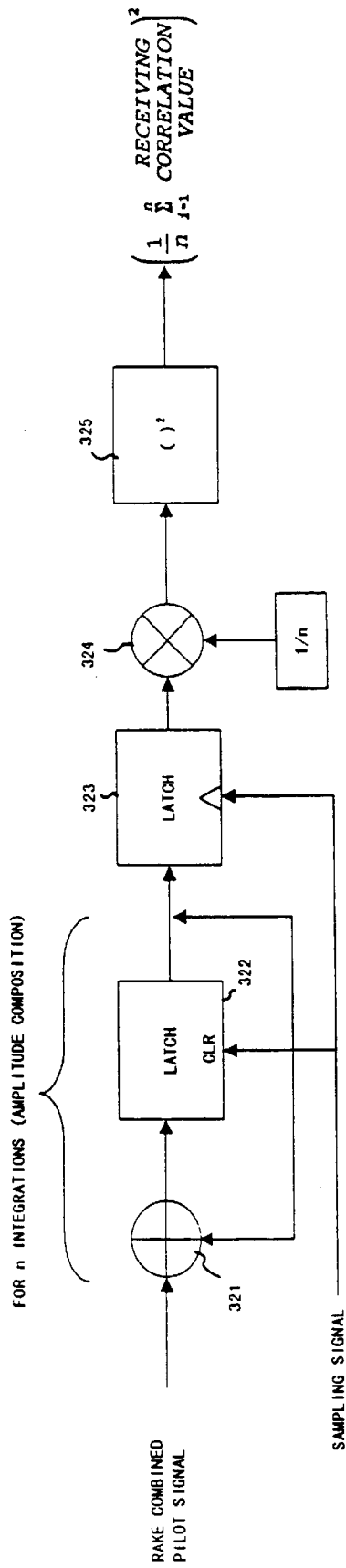
FIG. 47 shows the second configuration example of a power composer unit.

FIG. 47 shows a configuration example of the power composer unit 291 shown in FIG. 44. The configuration shown in FIG. 47 comprises an adder 321, latch circuits 322 and 323, a multiplier 324 and a square generator 325.

The adder 321 and the latch circuit 322 integrate n consecutive receiving correlation values, and the latch circuit 322 is cleared for each one sample time by a sampling signal. The latch circuit 323 latches the output of the latch circuit 322 for each one sample time by a sampling signal, and the multiplier 324 multiplies the output of the latch circuit 323 by 1/n. The square generator 325 squares the output of the multiplier 324, and outputs the result of the calculation as a sample value.

A fading pitch estimation unit 292 shown in FIG. 40 adds the absolute values of the differences between two consecutive values over a certain period of time, and estimates the moving speed from the sum based on the sample value of a desired signal power generated in this way, in the same way as shown in FIG. 36. In this case, the fading pitch estimation unit 292 comprises, for example, the same circuits as shown in FIG. 37.

The higher the moving speed is, the greater this sum becomes, since the higher the moving speed is, the more rapidly the desired signal power increases or decreases. Meanwhile, the lower the moving speed is, the smaller this sum becomes, since the lower the moving speed is, the more slowly the desired signal power increases or decreases. Accordingly, a moving speed can be estimated at a plurality of stages by dividing the range of the sum of differences between sample values. A moving speed can also be represented as an appropriate function of the sum.

A moving speed can also be estimated from the average value by measuring the moving average of these values when summing. differences between sample values over a certain period of time. More precise fluctuation of the moving speed can be estimated by measuring the moving average accurately.

Figure 48:
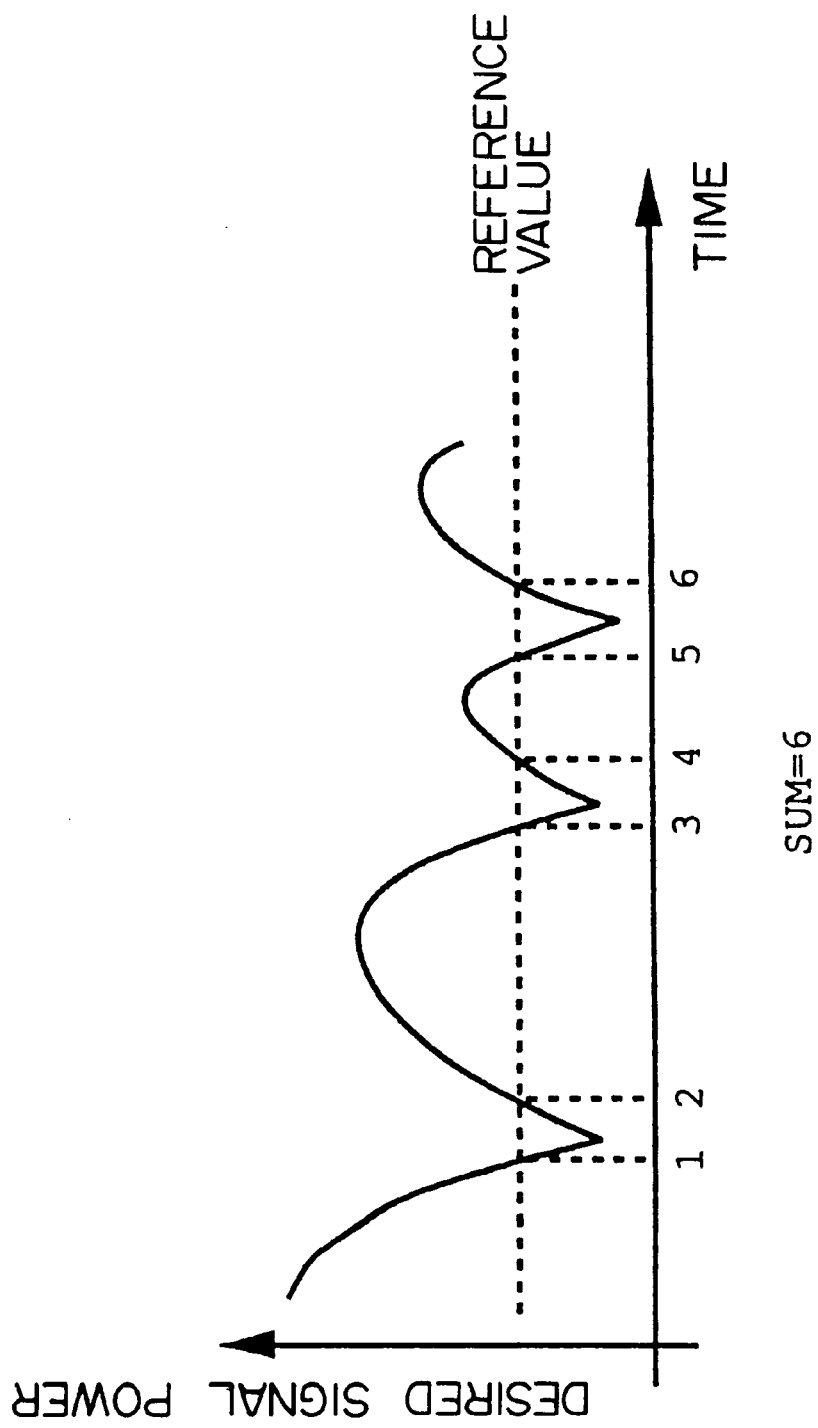
FIG. 48 shows the reference values of a desired signal power.

As shown in FIG. 48, by making the fading pitch estimation unit 292 count the frequency of the cases where the sample values of a desired signal power cross a certain reference value, a moving speed can also be estimated from the count value (SUM). The higher the moving speed is, the greater the count value becomes, while the lower the moving speed is, the smaller the count value becomes. Accordingly, a moving speed can be estimated using this count value in the same way as the above-mentioned differences between sample values are summed. In this case, the fading pitch estimation unit 292 comprises, for example, the same circuits as shown in FIG. 39.

By measuring the moving average of count values over a certain period of time when counting the crossing frequency, a moving speed can also be estimated from the average. More precise fluctuation of the moving speed can be estimated by measuring the moving average accurately.

Although both estimation methods using a TPC command and a desired signal power are described above, there is a certain correlation between the results of these two methods. Generally speaking, since the transmission power cannot be controlled by a TPC command when the moving speed exceeds a certain level, the change rate of a TPC command generated on the receiving side becomes constant.

Figure 49:
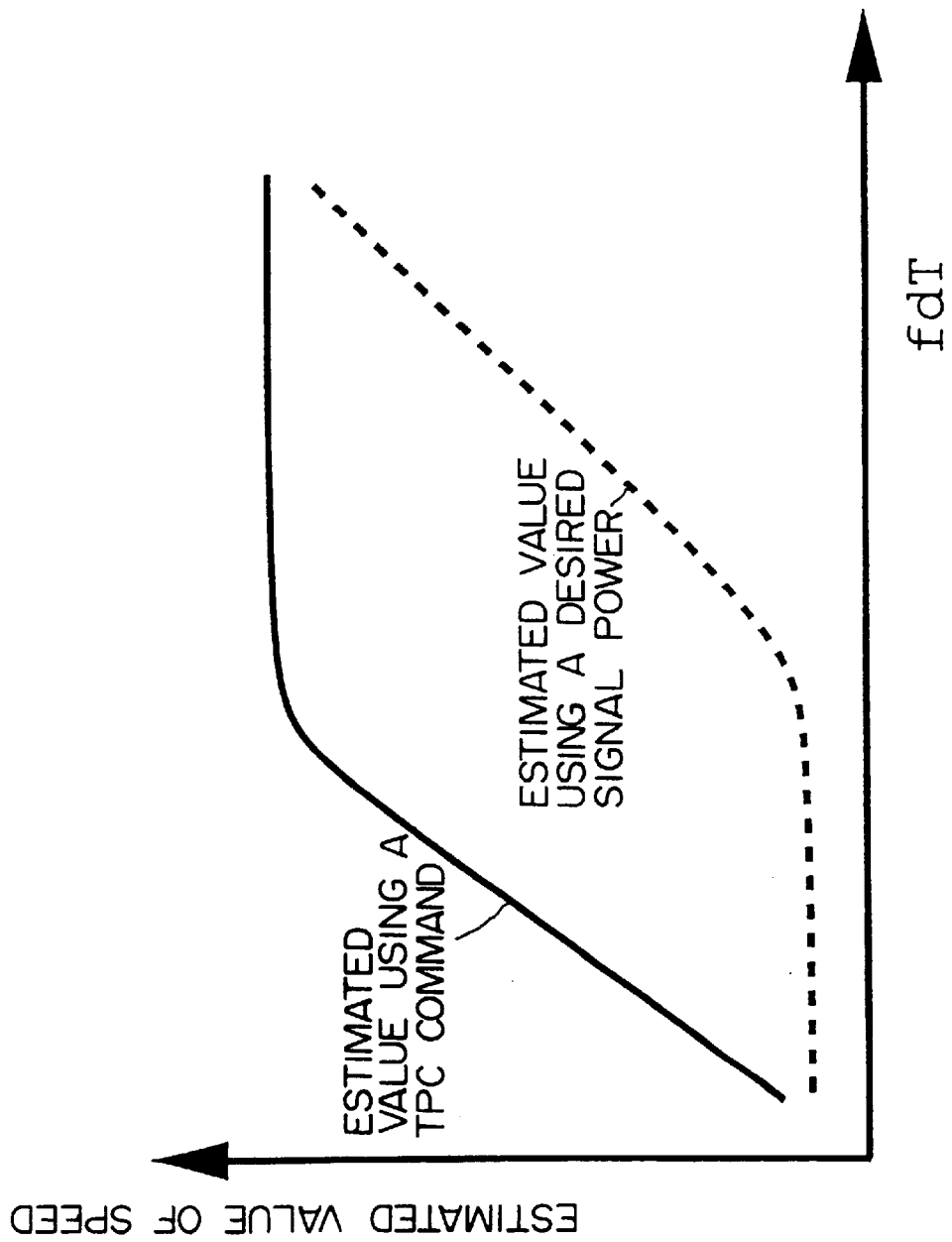
FIG. 49 shows the relationship between two estimation methods.

For this reason, in a method using a TPC command, the estimated speed obtained based on this change rate indicates a constant value in a high speed area beyond a certain level as shown in FIG. 49. FIG. 49 shows the relationship between the fading pitch (fdT) of a generated fading and the estimated speed. There is a close relationship between a fading pitch and an actual moving speed. The greater the fading pitch becomes, the higher the moving speed becomes.

On the other hand, in a method using a desired signal power, the estimated speed indicates a constant value in a low speed area below a certain level, the converse to the method using a TPC command. This is because when the moving speed is low, the value of a desired signal power becomes constant by the effective transmission power control of a TPC command. If the moving speed becomes high to some extent, the transmission power control becomes ineffective, and the desired signal power fluctuates. Accordingly, the moving speed can be estimated using the fluctuation.

Therefore, it is desirable to estimate a moving speed using these estimation methods simultaneously. For example, in an area where the estimated value obtained by a TPC command is saturated, an estimated value obtained by a desired signal power can be adopted, and in an area where the estimated value obtained by a desired signal power is saturated, an estimated value obtained by a TPC command can be adopted. By using the two methods simultaneously, the drawbacks of both methods can be supplemented by each other, and thereby the estimation range of a moving speed can be expanded.

In the above-mentioned embodiments, an arbitrary hardware or firmware such as a digital signal processor (DSP), etc. can be used for a circuit for estimating a moving speed and circuits for setting a variety of parameters for a communication apparatus. The target parameters for control are not limited to a searcher function, a transmission power control function and a coherent detection function, but can include any other functions.

Furthermore, the present invention is not limited to the communications in a DS-CDMA system, but can also be widely applied to the communications in a phase shift keying (PSK) system, a personal digital cellular (PDC) system, etc.

According to the present invention, in mobile communications in a CDMA system, etc. a variety of parameters for a communication apparatus can also be dynamically controlled according to an estimated speed, and thereby the receiving characteristic and the channel capacity can be improved.

What is claimed is:

1. A communication control apparatus for controlling a parameter of spread spectrum communication for mobile communications between a transmitting station and a receiving station, comprising:

a speed estimating unit estimating a moving speed of one of said transmitting station and said receiving station and outputting a control signal corresponding to the estimated moving speed; and a modifying unit modifying a value of said parameter based on said control signal, wherein said receiving station includes a searcher performing a search operation to detect a timing for despreading a spread spectra signal, and said modifying unit optimizes the search operation by controlling the frequency of the search operation based on the modified value of the parameter.

2. The communication control apparatus according to claim 1, wherein said modifying unit comprises a timer controlling a frequency of the search operation, and controls a cycle of said timer as said parameter.

3. The communication control apparatus according to claim 1, wherein said searcher detects a timing for despreading each signal of a plurality of spread spectrum channels, and said modifying unit controls a frequency of said search operation based on a control signal corresponding to an estimated moving speed of each spectrum channel.

4. The communication control apparatus according to claim 1, wherein said modifying unit controls the number of accumulation additions of a receiving correlation value generated by the searcher as said parameter in the search operation based on said control signal.

5. The communication control apparatus according to claim 4, wherein said searcher detects a timing for despreading each signal of a plurality of spread spectrum channels, and said modifying unit controls said number of accumulation additions based on a control signal corresponding to an estimated moving speed of each channel.

6. The communication control apparatus according to claim 1, wherein said speed estimating unit estimates one of a relative moving speed to said receiving station of said transmitting station and a relative moving speed to the transmitting station of the receiving station.

7. The communication control apparatus according to claim 1, wherein said speed estimating unit estimates said moving speed using a transmission power control command transmitted from said receiving station to said transmitting station.

8. The communication control apparatus according to claim 1, wherein said speed estimating unit estimates said moving speed using a desired signal power generated in said receiving station.

9. A communication control apparatus for controlling a parameter of spread spectrum communication for mobile communications between a transmitting station and a receiving station, comprising:

a speed estimating unit estimating a moving speed of one of said transmitting station and said receiving station and outputting a control signal corresponding to the estimated moving speed; and a modifying unit modifying a value of said parameter based on said control signal, wherein said receiving station includes a coherent detecting unit detecting a signal including a pilot signal, and said modifying unit controls a parameter in detecting operation performed by said coherent detecting unit as said parameter based on said control signal.

10. The communication control apparatus according to claim 9, wherein said modifying unit controls the number of pilot signals used to perform a phase estimation by said coherent detecting unit as said parameter in the detecting operation based on said control signal.

11. The communication control apparatus according to claim 9, wherein said modifying unit controls a weight coefficient of the pilot signal used to perform a phase estimation by the coherent detecting unit as said parameter in the detecting operation based on said control signal.

12. A communication control apparatus for controlling a parameter of spread spectrum communication for mobile communications between a transmitting station and a receiving station, comprising:

a speed estimating unit estimating a moving speed of one of said transmitting station and said receiving station and outputting a control signal corresponding to the estimated moving speed; and a modifying unit modifying a value of said parameter based on said control signal, wherein said receiving station includes an invalid path detecting unit detecting an invalid path with a signal level below a certain value, and said modifying unit controls a parameter in a detecting operation performed by said invalid path detecting unit as said parameter based on said control signal.

13. The communication control apparatus according to claim 12, wherein said modifying unit controls an observation length for the invalid path detecting means observing a signal as said parameter in the detecting operation based on said control signal.

14. The communication control apparatus according to claim 13, wherein said invalid path detecting unit comprises a filter filtering a signal to be observed, and said modifying unit controls a filter length of the filter as said parameter in the detecting operation based on said control signal.

15. A receiver comprising:

a speed estimating unit estimating a moving speed of a transmitting station in mobile communications and outputting a control signal corresponding to the estimated moving speed; and a modifying unit moding a value of a parameter of spread spectrum communication for said mobile communications based on said control signal, wherein said modifying unit controls a parameter in at least one or more of a search operation for detecting a timing for despreading a spread spectrum signal, a detecting operation for detecting a signal including a pilot signal, and a detecting operation for detecting an invalid path as said parameter of spread spectrum.

16. A receiver comprising:

a speed estimating unit for estimating a moving speed of a transmitting station in mobile communications and outputting a control signal corresponding to the estimated moving speed;

a modifying unit modifying a value of a parameter of spreading spectrum communication for said mobile communications based on said control signal; and a searcher performing a search operation to detect a timing for despreading a spread spectrum signal, wherein said modifying unit optimizes the search operation by controlling the frequency of the search operation based on the modified value of the parameter.

* * * * *